United States Patent
Ishimaru

(10) Patent No.: US 7,024,115 B2
(45) Date of Patent: Apr. 4, 2006

(54) APPARATUS AND METHOD FOR SELF-ROUTING OPTICAL PACKET

(75) Inventor: Yoshihiro Ishimaru, Tokyo (JP)

(73) Assignee: NEC Corporation, Tokyo (JP)

( * ) Notice: Subject to any disclaimer, the term of this patent is extended or adjusted under 35 U.S.C. 154(b) by 658 days.

(21) Appl. No.: 10/119,850

(22) Filed: Apr. 11, 2002

(65) Prior Publication Data

US 2002/0171893 A1 Nov. 21, 2002

(30) Foreign Application Priority Data

May 18, 2001 (JP) .............................. 2001-149326

(51) Int. Cl.
  *H04J 14/00* (2006.01)
(52) U.S. Cl. ..................... 398/57; 398/45; 398/48; 398/49; 398/53; 398/56; 370/392
(58) Field of Classification Search .................. 398/45, 398/48–57; 370/351–360, 390, 237, 238, 370/389, 535, 432, 278, 227, 225, 217, 392, 370/355, 356; 709/238–244
See application file for complete search history.

(56) References Cited

U.S. PATENT DOCUMENTS 6,850,515 B1 * 2/2005 Chang et al. ............... 370/352

FOREIGN PATENT DOCUMENTS

| JP | 6-261073 | 9/1994 |
|---|---|---|
| JP | 11-237653 | 8/1999 |
| JP | 2000-137258 | 5/2000 |
| JP | 2000-241839 | 9/2000 |

OTHER PUBLICATIONS

Takaaki Mukaui and Tadashi Saitoh, "Nearly Degenerate Four-Wave Mixing in a Traveling-Wave Semiconductor Laser Amplifier", Published by IEICE Technical Report, OQE88-34, 1988.
Max Schubert and Bernd Wilhelmi, "Nonlinear Optics and Quantum Electronics". "Statistical Optics", Jospeh W Goodman (1985), "Optical Radiation Detectors", Eustace L. Dereniak and Devon G. Crowe (1984), "Optical Waves in Crystals", Ammon Yariv and Pochi Yeh (1983).

* cited by examiner

*Primary Examiner*—David C. Payne
(74) *Attorney, Agent, or Firm*—Young & Thompson

(57) ABSTRACT

One of optical packets x copied by an optical copying mechanism 11 is converted into an electric packet by an optic/electric converting mechanism 13. An address information extracting mechanism 14 extracts address information from a header of the packet converted into the electric packet. A control light generating mechanism 15 generates a control light based on the extracted address information. The other of the copied optical packets x is delayed by an optical delaying mechanism 12 for a predetermined time, and entered to a third nonlinear optical effect device 1b. The third nonlinear optical effect device 1b switches a route of the optical packet x based on the control light. The optical packet x is outputted through an optic/electric converting mechanism 1h0, a buffer 1i0, a multiplexing mechanism 1j, and an electric/optic converting mechanism 1k.

15 Claims, 11 Drawing Sheets

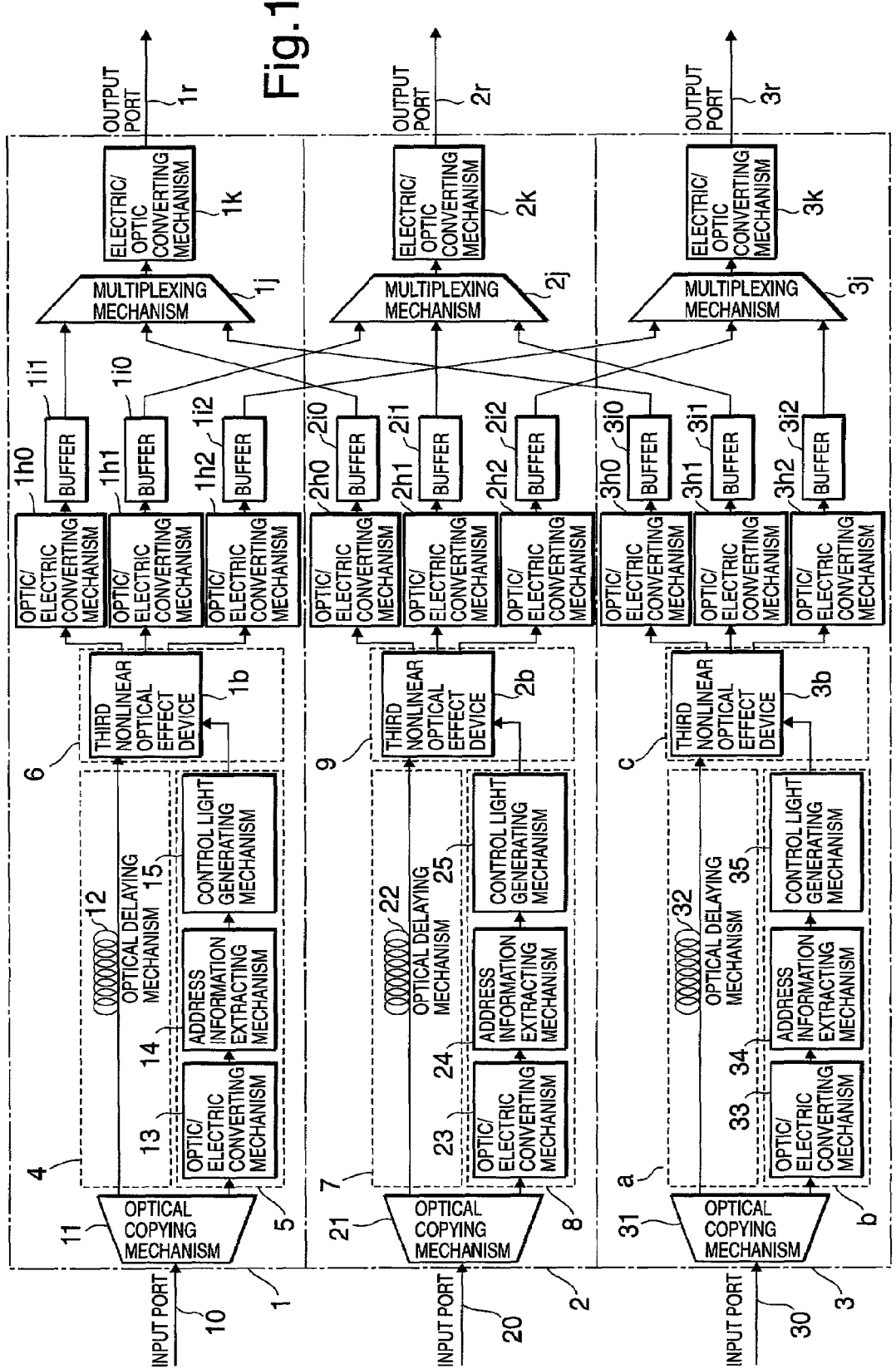

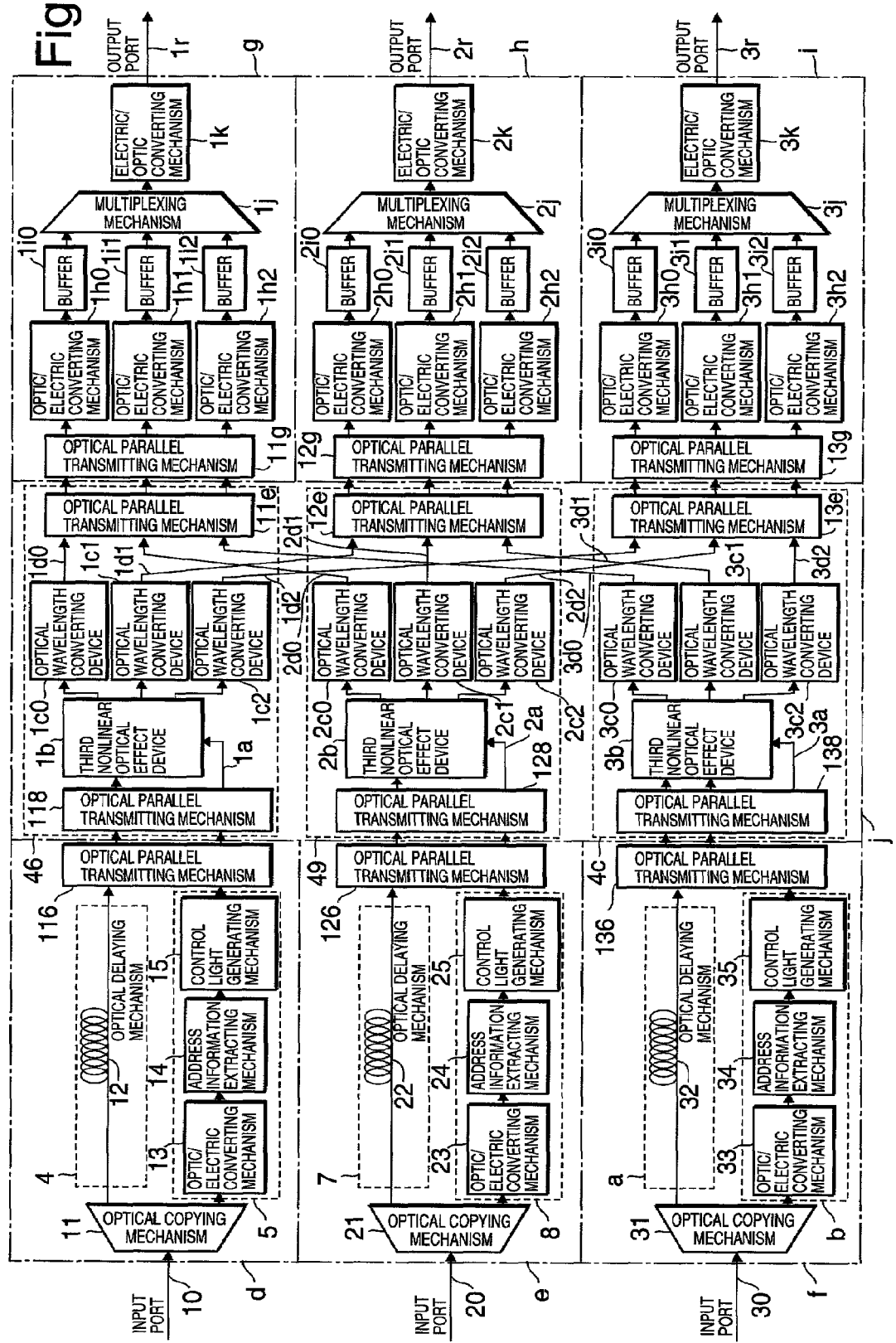

APPARATUS AND METHOD FOR SELF-ROUTING OPTICAL PACKET

BACKGROUND OF THE INVENTION

1. Field of the Invention

The present invention relates to an apparatus and a method for self-routing an optical packet. More particularly, the invention relates to an apparatus and a method for self-routing an optical packet, which are designed to switch optical packets entered to a switching device based on a control light made incident on the switching device so as to be synchronized with the entry of the optical packet.

2. Description of the Related Art

Conventionally, in an apparatus and a method for self-routing an optical packet, an optical pulse of a header has been extracted from an optical packet, the optical pulse indicating the header has been converted into an electric signal, and an electric control light switching device has been controlled based on self-routing information extracted from the electric signal. Thus, a destination of the optical packet entered with the electric self-routing information to the electric control light switching device has been controlled.

However, in the above-described conventional technology, the electric control light switching device has been controlled by an electric control signal. Consequently, a problem has been inevitable. That is, when the electric control signal is transmitted for a long distance at a high speed, for example between packages or between casings, degradation occurs in a transmitted waveform, limiting a transmission distance.

SUMMARY OF THE INVENTION

An object of the present invention is to provide an apparatus and a method for self-routing an optical packet, which remove limitations imposed on a transmission distance in an electrical control signal to control self-routing an optical packet.

An apparatus for self-routing an optical packet according to the present invention includes: one or more input ports and two or more output ports, optical packets entered from predetermined one of the input ports being outputted from predetermined one of the output ports; copying unit for copying the optical packets entered from the predetermined input port; first electric converting unit for converting one of the optical packets copied by the optical packet copying unit into an electric packet; address information extracting unit for extracting address information regarding the predetermined output port for outputting the entered optical packets from the packet converted into the electric packet by the first electric converting unit; control light generating unit for generating a predetermined control light based on the address information extracted by the address information extracting unit; delaying unit for delaying the other of the optical packets copied by the optical packet copying unit for a predetermined time; and route switching unit for switching a route of the optical packet delayed by the delaying unit based on the control light generated by the control light generating unit.

In addition, a method for self-routing an optical packet according to the present invention uses an optical packet self-routing apparatus including one or more input ports and two or more output ports, and outputs optical packets entered from predetermined one of the input ports from predetermined one of the output ports. The method includes: a copying step of copying the optical packets entered from the predetermined input port; a first electric converting step of converting one of the optical packets copied in the optical packet copying step into an electric packet; an address information extracting step of extracting address information regarding the predetermined output port for outputting the entered optical packets from the packet converted into the electric packet in the first electric converting step; a control light generating step of generating a predetermined control light based on the address information extracted in the address information extracting step; a delaying step of delaying the other of the optical packets copied in the optical packet copying step for a predetermined time; and a route switching step of switching a route of the optical packet delayed in the delaying step based on the control light generated in the control light generating step.

BRIEF DESCRIPTION OF THE DRAWINGS

The above and other objects, features and advantages of the present invention will become more apparent from the following detailed description when taken in conjunction with the accompanying drawings wherein:

FIG. 1 is a block diagram showing a configuration of a self-routing apparatus of an optical packet according to a first embodiment of the present invention;

FIGS. 7(a) and 7(b) are views, each showing an operation of an optical logic device according to the third embodiment of the invention, i.e., FIG. 7(a) showing an operation when a control light is Off, and FIG. 7(b) showing an operation when a control light is On;

FIG. 11 is a block diagram showing a configuration of a self-routing apparatus of an optical packet according to a fourth embodiment of the invention.

DETAILED DESCRIPTION OF THE PREFERRED EMBODIMENTS

Figure 2A:
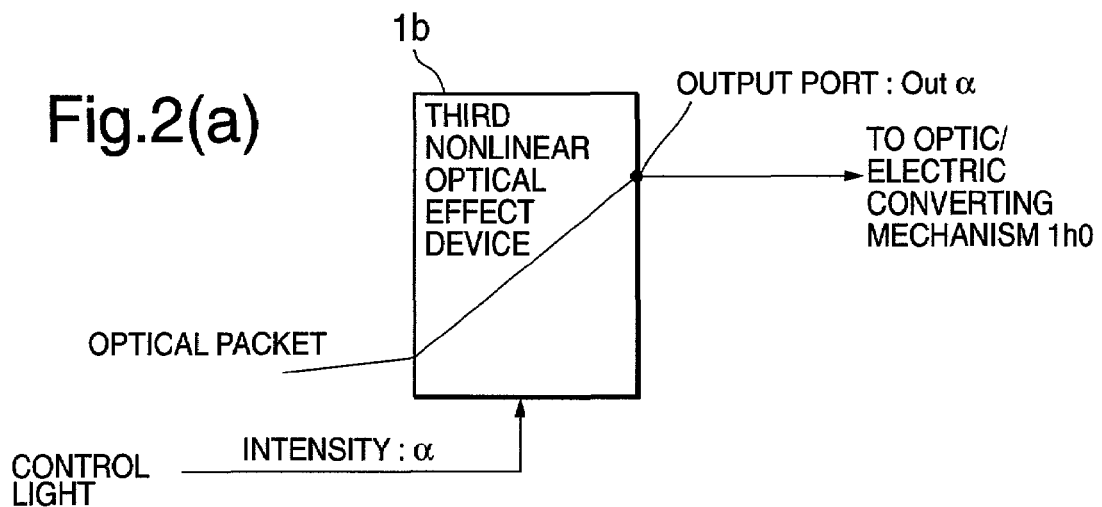
FIGS. 2(a) to 2(c) are views, each showing an operation of a third nonlinear optical effect device according to the first embodiment of the invention, i.e., FIG. 2(a) showing an operation when a control light of an intensity α is made incident, FIG. 2(b) showing an operation when a control light of an intensity β is made incident, and FIG. 2(c) showing an operation when a control light of an intensity γ is made incident.

Next, description will be made of the preferred embodiments of the present invention regarding an apparatus and a method for self-routing an optical packet with reference to FIGS. 1 to 10.

FIG. 1 shows a configuration of a self-routing apparatus of an optical packet according to a first embodiment of the present invention. Hereinafter, by referring to FIG. 1, description is made of the configuration and an operation of the optical packet self-routing apparatus of the embodiment.

In the embodiment, the self-routing apparatus of the optical packet is composed of portions 1, 2 and 3.

The portion 1 includes an input port 10, an optical copying mechanism 11, a channel route 4, a control system route 5, a portion 6, optic/electric converting mechanisms $1h0$ to $1h2$, buffers $1i0$ to $1i2$, a multiplexing mechanism $1j$, an electric/optic converting mechanism $1k$, and an output port $1r$. The channel route 4 has an optical delaying mechanism 12. The control system route 5 has an optic/electric converting mechanism 13, an address information extracting mechanism 14, and a control light generating mechanism 15. The portion 6 has a third nonlinear optical effect device $1b$.

The portion 2 includes an input port 20, an optical copying mechanism 21, a channel route 7, a control system route 8, a portion 9, optic/electric converting mechanisms $2h0$ to $2h2$, buffers $2i0$ to $2i2$, a multiplexing mechanism $2j$, an electric/optic converting mechanism $2k$, and an output port $2r$. The channel route 7 has an optical delaying mechanism 22. The control system route 8 has an optic/electric converting mechanism 23, an address information extracting mechanism 24, and a control light generating mechanism 25. The portion 9 has a third nonlinear optical effect device $2b$.

The portion 3 includes an input port 30, an optical copying mechanism 31, a channel route a, a control system route b, a portion c, optic/electric converting mechanisms $3h0$ to $3h2$, buffers $3i0$ to $3i2$, a multiplexing mechanism $3j$, an electric/optic converting mechanism $3k$, and an output port $3r$. The channel route a has an optical delaying mechanism 32. The control system route b has an optic/electric converting mechanism 33, an address information extracting mechanism 34, and a control light generating mechanism 35. The portion c has a third nonlinear optical effect device $3b$.

The input ports 10, 20 and 30 are portions which receive optical packets. The optical copying mechanisms 11, 21 and 31 copy the optical packets entered to the input ports 10, 20 and 30, respectively. A function of the optical copying mechanism may be achieved, for example, by amplifying an optical packet entered through an input port with an optical amplifier, and then branching the amplified optical packet with an optical coupler, and outputting the result.

Each of the optical packets copied by the optical copying mechanisms 11, 21 and 31 is entered to a two-way route, i.e., one way being composed of each of the optical delaying mechanisms 12, 22 and 32, and the other being composed of each of the optic/electric converting mechanisms 13, 23 and 33.

The channel routes 4, 7 and a respectively including the optical delaying mechanisms 12, 22 and 32 are provided to pass optical packets containing channel data. The control system route 5 including the optic/electric converting mechanism 13, the address information extracting mechanism 14, and the control light generating mechanism 15 is provided to generate and pass control data (e.g., control light for controlling the third nonlinear optical effect device $1b$). The control system route 8 including the optic/electric converting mechanism 23, the address information extracting mechanism 24, and the control light generating mechanism 25, and the control system route b including the optic/electric converting mechanism 33, the address information extracting mechanism 34, and the control light generating mechanism 35 are similar in configuration to the control system route 5.

The optical delaying mechanisms 12, 22 and 32 delay optical packets by predetermined time in order to synchronize the optical packets with control lights outputted from the control light generating mechanisms 15, 25 and 35. For example, the optical delaying mechanisms 12, 22 and 32 may be delay lines made of optical fibers.

The optic/electric converting mechanisms 13, 23, 33, $1h0$ to $1h2$, $2h0$ to $2h2$, and $3h0$ to $3h2$ convert optical signals into electric signals. The address information extracting mechanisms 14, 24 and 34 extract address information recorded in headers of the packets converted into electric signals by the optic/electric converting mechanisms 13, 23 and 33. The control light generating mechanisms 15, 25, and 35 generate control lights for controlling the third nonlinear optical effect devices $1b$, $2b$ and $3b$ based on the address information of the packets extracted by the address information extracting mechanisms 14, 24 and 34.

The third nonlinear optical effect devices $1b$, $2b$ and $3b$ refract the optical packets entered from the optical delaying mechanisms 12, 22 and 32 in predetermined directions based on the control lights generated by the control light generating mechanisms 15, 25 and 35. Such a phenomenon of a change made in a refractive index depending on an intensity of a control light is called an optical Kerr effect.

By using the optical Kerr effect, the third nonlinear optical effect device $1b$ refracts the optical packet such that the optical packet can be entered to one of the optic/electric converting mechanisms $1h0$ to $1h2$. Similarly, the third nonlinear optical effect device $2b$ refracts the optical packets such that the optical packets can be entered to one of the optic/electric converting mechanisms $2h0$ to $2h2$, and the third nonlinear optical effect device $3b$ refracts the optical packets such that the optical packets can be entered to one of the optic/electric converting mechanisms $3h0$ to $3h2$.

The third nonlinear optical effect devices $1b$ to $3b$ may be made of organic materials, organic compound superlattice thin films, inorganic compound superlattice thin films, or particle dispersed materials.

The optic/electric converting mechanisms $1h0$ to $1h2$ convert the optical packets entered from the third nonlinear optical effect device $1b$ into electric signals. The buffers $1i0$ to $1i2$ temporarily store the packets converted into the electric signals by the optic/electric converting mechanisms $1h0$ to $1h2$.

Similarly, the optic/electric converting mechanisms $2h0$ to $2h2$ convert the optical packets entered from the third nonlinear optical effect device $2b$ into electric signals. The buffers $2i0$ to $2i2$ temporarily store the packets converted into the electric signals by the optic/electric converting mechanism $2h0$ to $2h2$.

Also, similarly, the optic/electric converting mechanisms $3h0$ to $3h2$ convert the optical packets entered from the third nonlinear optical effect device $3b$ into electric signals. The buffers $3i0$ to $3i2$ temporarily store the packets converted into the electric signals by the optic/electric converting mechanism $3h0$ to $3h2$.

The packets temporarily stored in the buffers $1i0$, $2i0$ and $3i0$ are entered to the multiplexing mechanism $1j$. Similarly, the packets temporarily stored in the buffers $1i1$, $2i1$ and $3i1$ are entered to the multiplexing mechanism $2j$, and the packets temporarily stored in the buffers 1*i*2, 2*i*2 and 3*i*2 to the multiplexing mechanism 3*j*.

The multiplexing mechanism 1*j* adjusts and multiplexes a packet addressed to the output port 1*r*. Similarly, the multiplexing mechanisms 2*j* and 3*j* respectively adjust and multiplex packets addressed to the output ports 2*r* and 3*r*.

The electric/optic converting mechanisms 1*k*, 2*k* and 3*k* convert electric packets outputted from the multiplexing mechanisms 1*j*, 2*j* and 3*j* into optical packets, respectively. The packets converted into the optical packets by the electric/optic converting mechanisms 1*k*, 2*k* and 3*k* are respectively outputted from the output ports 1*r*, 2*r* and 3*r*.

Figure 2B:
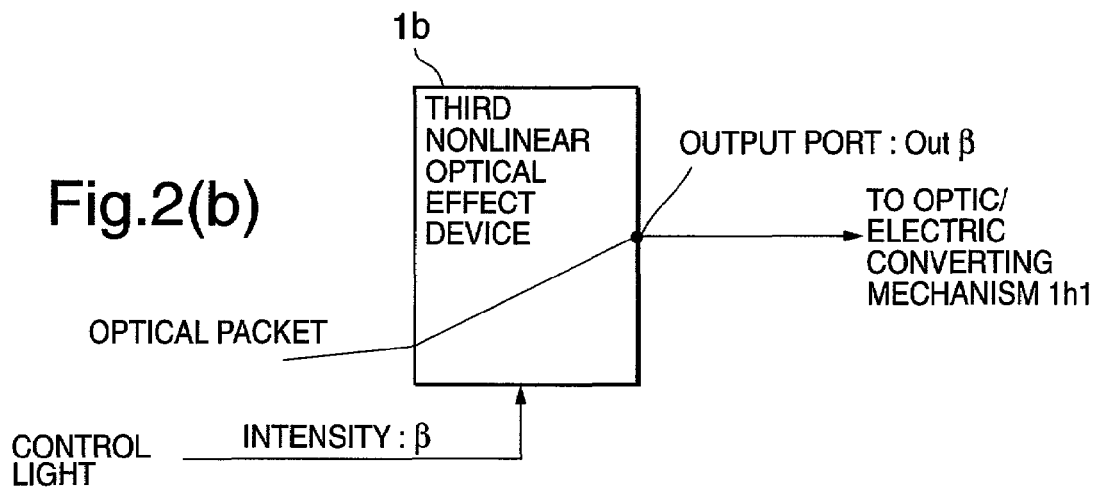
Figure 2C:
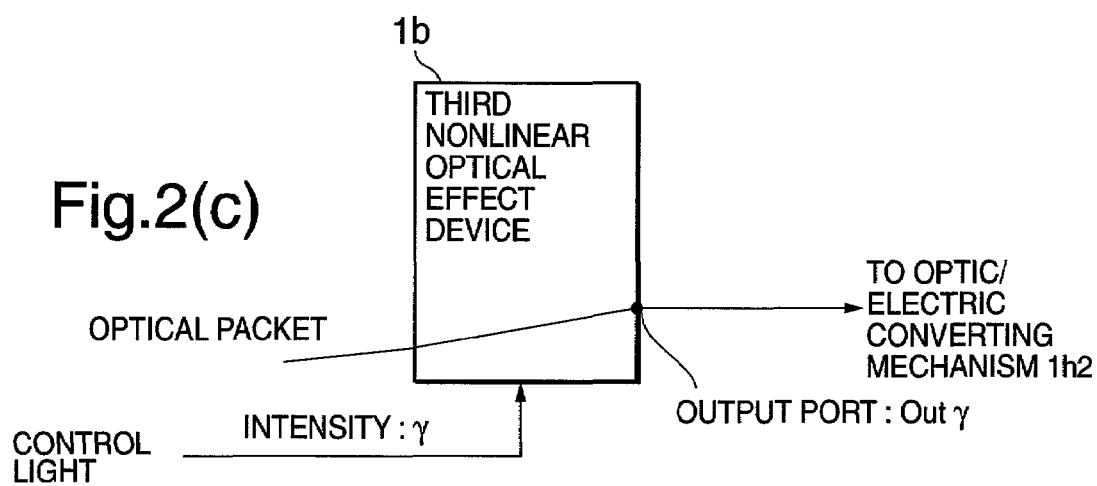

Each of FIGS. 2(*a*) to 2(*c*) shows an operation of the third nonlinear optical effect device 1*b* according to the first embodiment of the invention. Hereinafter, by referring to FIGS. 2(*a*) to 2(*c*), description is made of a configuration and the operation of the third nonlinear optical effect device 1*b* of the embodiment. The third nonlinear optical effect devices 2*b* and 3*b* are similar in configuration and operation to the third nonlinear optical effect device 1*b*.

A refractive index of the third nonlinear optical effect device 1*b* is decided by the above-described optical Kerr effect based on an intensity of a control light generated by the control light generating mechanism 15. Setting of the intensity of the control light enables an optical packet entered from the optical delaying mechanism 12 to be refracted in a predetermined direction.

FIG. 2(*a*) shows an operation of the third nonlinear optical effect device 1*b* when an intensity of a control light is $\alpha$. Upon incidence of the control light of the intensity $\alpha$ from the control light generating mechanism 15 on the third nonlinear optical effect device 1*b*, the third nonlinear optical effect device 1*b* is set to a predetermined refractive index. The optical packet outputted from the optical delaying mechanism 12 is refracted, outputted from an output port Out $\alpha$ of the nonlinear optical effect device 1*b*, and entered to the optic/electric converting mechanism 1*h*0.

FIG. 2(*b*) shows an operation of the third nonlinear optical effect device 1*b* when an intensity of a control light is $\beta$. Upon incidence of the control light of the intensity $\beta$ from the control light generating mechanism 15 on the third nonlinear optical effect device 1*b*, the third nonlinear optical effect device 1*b* is set to a predetermined refractive index. The optical packet outputted from the optical delaying mechanism 12 is moved straight ahead, outputted from an output port Out $\beta$ of the nonlinear optical effect device 1*b*, and entered to the optic/electric converting mechanism 1*h*1.

FIG. 2(*c*) shows an operation of the third nonlinear optical effect device 1*b* when an intensity of a control light is $\gamma$. Upon incidence of the control light of the intensity $\gamma$ from the control light generating mechanism 15 on the third nonlinear optical effect device 1*b*, the third nonlinear optical effect device 1*b* is set to a predetermined refractive index. The optical packet outputted from the optical delaying mechanism 12 is refracted, outputted from the output port Out $\gamma$ of the nonlinear optical effect device 1*b*, and entered to the optic/electric converting mechanism 1*h*2.

In the embodiment, the optical packets entered to the third nonlinear optical effect device 1*b* are distributed (switched) in three directions depending on the intensity of the control light. However, the number of distributing directions may be a value other than 3.

In the embodiment, the output ports Out $\alpha$, $\beta$ and $\gamma$ of the third nonlinear optical effect device 1*b* are respectively connected to the optic/electric converting mechanisms 1*h*0, 1*h*1 and 1*h*2.

Similarly, in the embodiment, the output ports Out $\alpha$, $\beta$ and $\gamma$ of the third nonlinear optical effect device 2*b* are respectively connected to the optic/electric converting mechanisms 2*h*0, 2*h*1 and 2*h*2.

Also, similarly, in the embodiment, the output ports Out $\alpha$, $\beta$ and $\gamma$ of the third nonlinear optical effect device 3*b* are respectively connected to the optic/electric converting mechanisms 3*h*0, 3*h*1 and 3*h*2.

Figure 3:
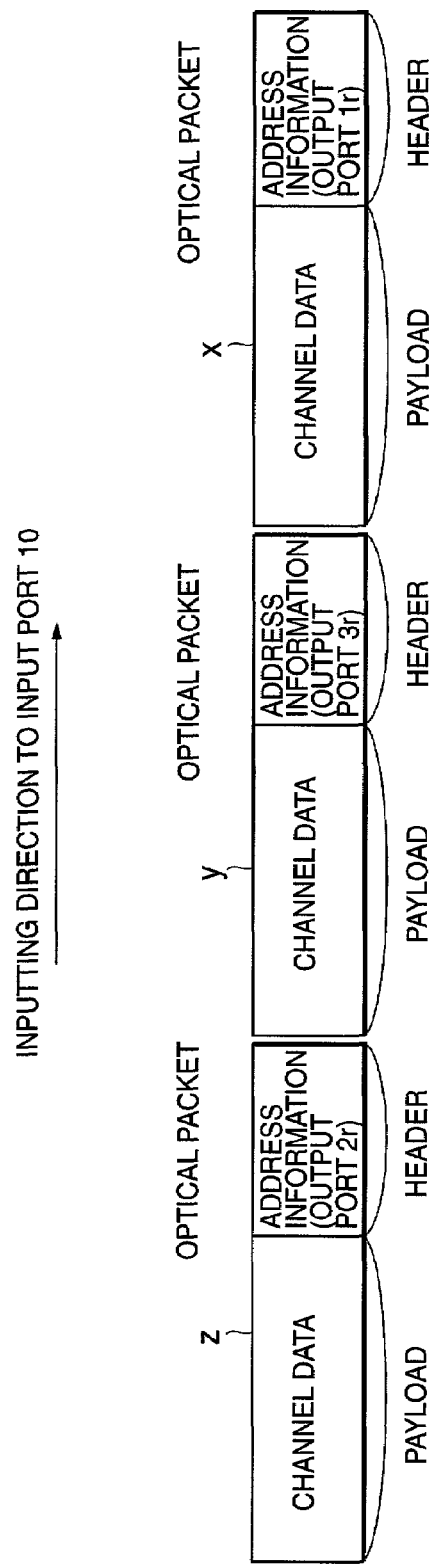
FIG. 3 is a view showing a structure of an optical packet according to the first embodiment of the invention.

FIG. 3 shows a structure of each of optical packets x to z in the first embodiment of the invention. Hereinafter, by referring to FIG. 3, description is made of the structure of each of the optical packets x to z of the invention.

As shown in FIG. 3, each of the optical packets x to z has a header and a payload. Channel data is recorded in the payload of each of the optical packets x to z. In the header of each of the optical packets x to z, address information containing a last address (e.g., output port) to be reached by the optical packet is recorded.

In the header of the optical packet x, address information, i.e., the output port 1*r*, is recorded. The optical packet x is subjected to routing by the optical packet self-routing apparatus based on the address information, and outputted from the output port 1*r*.

Similarly, in the header of the optical packet y, address information, i.e., the output port 3*r*, is recorded. The optical packet y is subjected to routing by the optical packet self-routing apparatus based on the address information, and outputted from the output port 3*r*.

Also, similarly, in the header of the optical packet z, address information, i.e., the output port 2*r*, is recorded. The optical packet z is subjected to routing by the optical packet self-routing apparatus based on the address information, and outputted from the output port 2*r*.

As shown in FIG. 3, the optical packets x to z are continuously entered to the input port 10 in this order.

Figure 8:
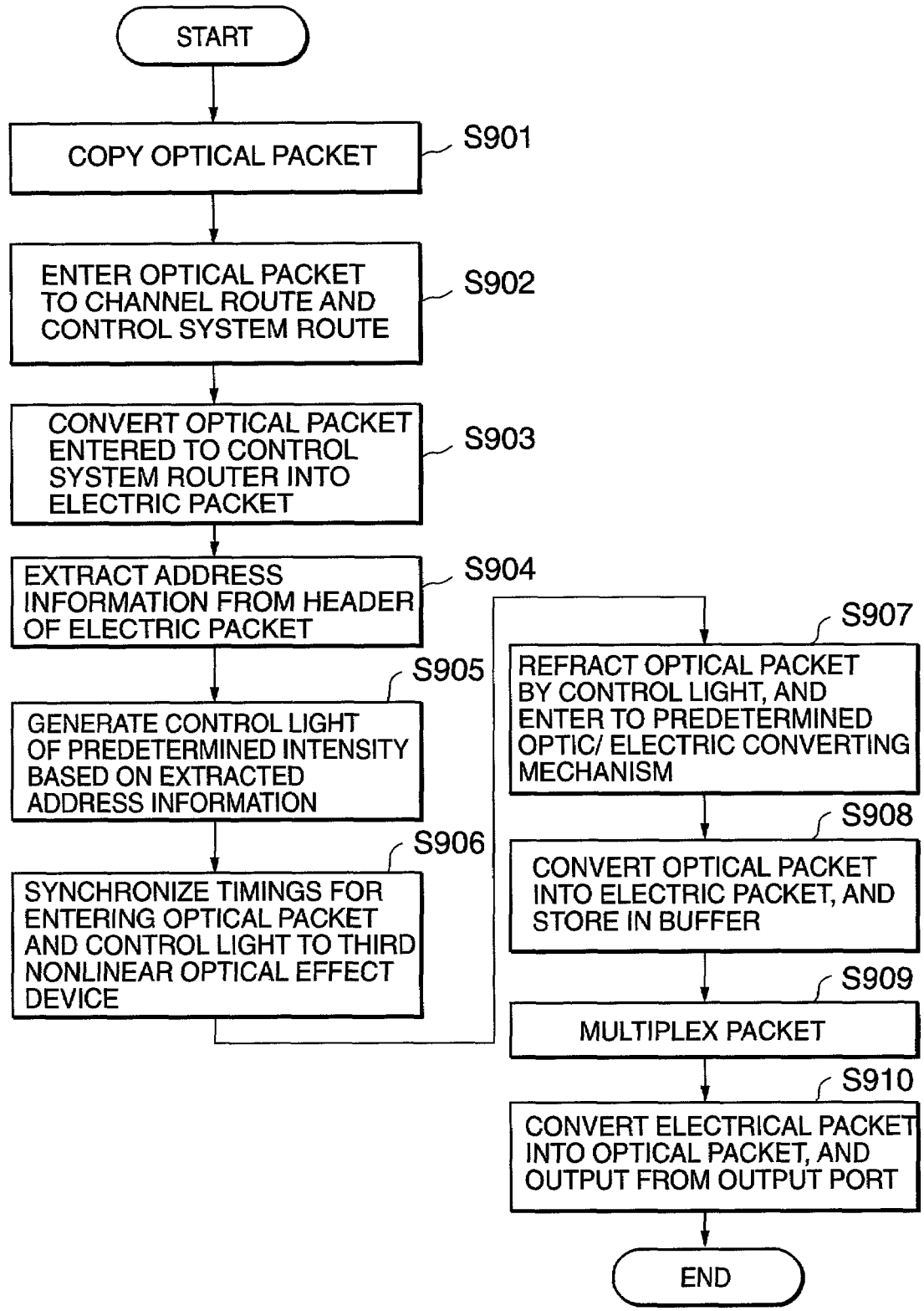
FIG. 8 is a flowchart showing an operational flow of the self-routing apparatus of the optical packet of the first embodiment of the invention.

FIG. 8 is a flowchart showing an operational flow of the optical packet self-routing apparatus according to the first embodiment of the invention. Hereinafter, by referring to FIGS. 1 to 3, and along FIG. 8, description is made of the operation of the optical packet self-routing apparatus of the first embodiment of the invention.

The optical packet self-routing apparatus shown in FIG. 1 is composed of the portions 1, 2 and 3 surrounded by a broken line. The portions 2 and 3 are similar in configuration to the portion 1, and similarly operated. Hereinafter, description is made of the operation of the optical packet self-routing apparatus of the embodiment focusing on the configuration and the operation of the portion 1.

When the optical packets x to z are continuously entered to the input port 10 in this order, the optical packet x is copied by the optical copying mechanism 11 (step S901). The optical packet x copied by the optical copying mechanism 11 becomes two in number, and then severally entered to the channel route 4 and the control system route 5 (step S902).

The optical packet x entered to the control system route 5 is converted into an electric packet by the optic/electric converting mechanism 13, being converted into an electric packet x (step S903). The electric packet x obtained by the conversion at the optic/electric converting mechanism 13 is entered to the address information extracting mechanism 14.

The address information extracting mechanism 14 reads address information recorded in a header of the entered electric packet x (step S904). The address information contains information on an output port, to which the optical packet x is outputted, or the like. The address information extracting mechanism 14 recognizes that an output destination of the optical packet x is the output port $1r$. In addition, the address information extracting mechanism 14 controls and drives the control light generating mechanism 15 based on the recognized output destination of the optical (electric) packet x, i.e., the output port $1r$, such that the optical (electric) packet x can be outputted from the output port $1r$.

The control light generating mechanism 15 generates a control light of an intensity $\alpha$ for control performed such that the optical packet x can be entered from the third nonlinear optical effect device $1b$ to the optic/electric Converting mechanism $1h0$ (step S905). The control light generating mechanism 15 makes the generated control light of the intensity $\alpha$ incident on the third nonlinear optical effect device $1b$.

The optical delaying mechanism 12 delays the optical packet x entered to the channel route 4 by a predetermined time, and synchronizes a timing for entering the optical packet x to the third nonlinear optical effect device $1b$ with a timing for making the control light generated by the control light generating mechanism 15 incident on the third nonlinear optical effect device $1b$ (step S906).

A refractive index in the third nonlinear optical effect device $1b$ is set based on the control light of the intensity $\alpha$ made incident from the control light generating mechanism 15. The optical packet entered through the channel route 4 to the third nonlinear optical effect device $1b$ is refracted based on the above-described refractive index, and outputted from the output port Out $\alpha$ of the third nonlinear optical effect device $1b$. The optical packet x outputted from the output port Out $\alpha$ of the third nonlinear optical effect device $1b$ is entered to the optic/electric converting mechanism $1h0$ (step S907).

The optical packet x is converted into an electric packet x by the optic/electric converting mechanism $1h0$. The electric packet x is outputted from the optic/electric converting mechanism $1h0$, and stored in the buffer $1i0$ (step S908). When optical packets entered to a plurality of input ports are outputted from the same output port, the optical packets may clash with each other in a route from the plurality of input ports to a single output port. By temporarily storing the packets in the buffer as described above, it is possible to prevent clashing of the packets with each other.

In order to prevent clashing with other packets, the electric packet x is entered from the buffer $1i0$ to the multiplexing mechanism $1j$. The multiplexing mechanism $1j$ receives and multiplexes the packets from the buffers $1i0$, $2i0$ and $3i0$ in a manner of adjusting the packets so as to prevent clashing thereof (step S909).

The multiplexing mechanism $1j$ sends the multiplexed packets to the electric/optic converting mechanism $1k$. Each electric packet entered to the electric/optic converting mechanism $1k$ is converted into an optical packet, and outputted from the output port $1r$ (step S910).

As in the case of the optical packet x, the optical packet y is entered through the optical copying mechanism 11 and the channel route 4 to the third nonlinear optical effect device $1b$. Based on address information recorded in the header of the optical (electric) packet y, i.e., the output port $3r$, the optical packet y is entered to the optic/electric converting mechanism $1h2$, converted into an electric packet y, and then stored in the buffer $1i2$. The electric packet y is multiplexed with other packets by the multiplexing mechanism $3j$, converted into an optical packet by the electric/optic converting mechanism $3k$, and then outputted from the output port $3r$.

As in the case of the optical packet x, the optical packet z is entered through the optical copying mechanism 11 and the channel route 4 to the third nonlinear optical effect device $1b$. Based on address information recorded in the header of the optical (electric) packet z, i.e., the output port $2r$, the optical packet z is entered to the optic/electric converting mechanism $1h1$, converted into an electric packet z, and then stored in the buffer $1i1$. The electric packet z is multiplexed with other packets by the multiplexing mechanism $2j$, converted into an optical packet by the electric/optic converting mechanism $2k$, and then outputted from the output port $2r$.

As described above, according to the embodiment, by switching the optical packets in the portions 6, 9 and c through optical processing (no electrical processing), it is possible to remove limitations imposed on the transmission distance of an electric control signal in the conventional electrical processing control system route.

Figure 4:
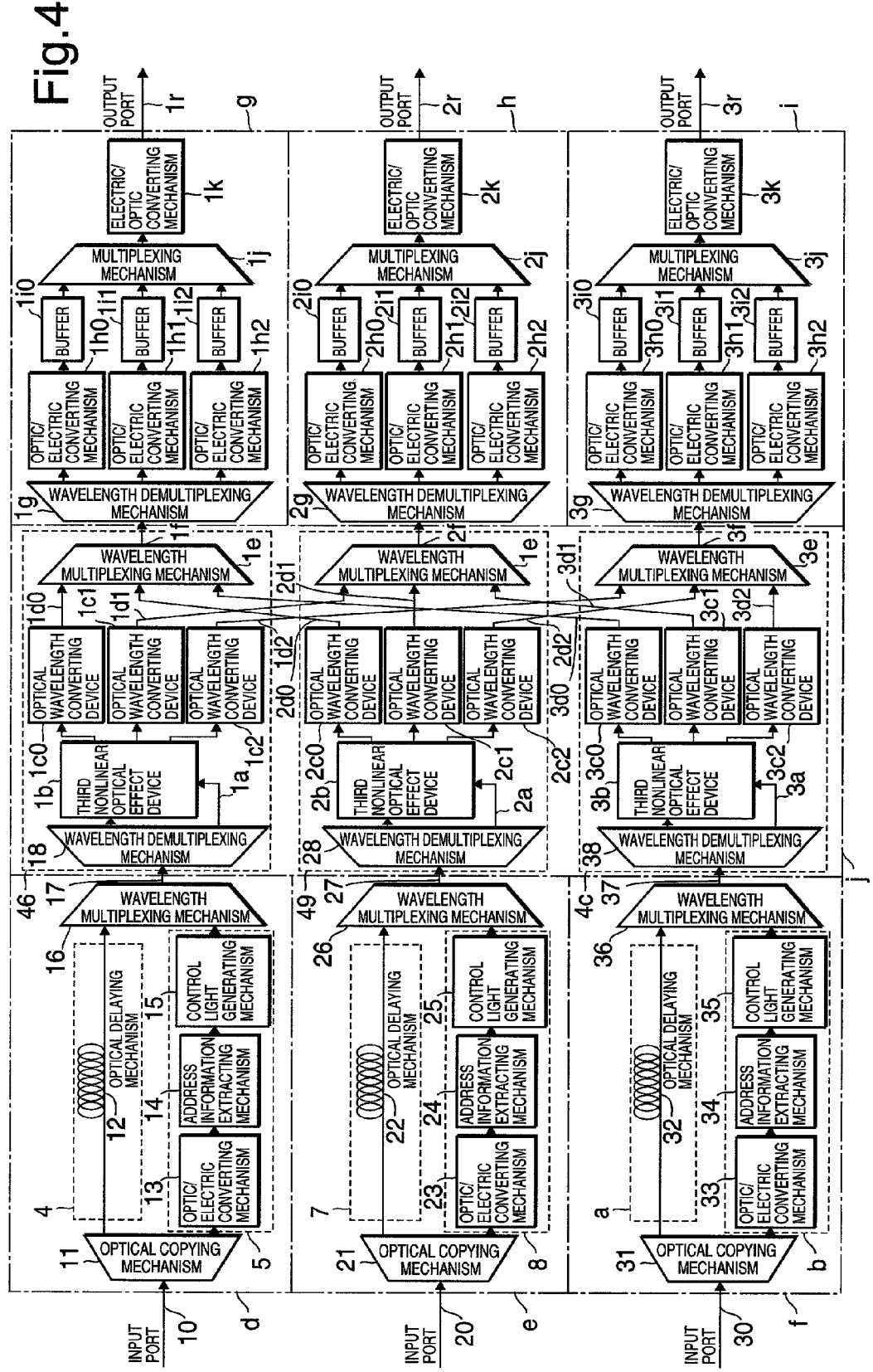
FIG. 4 is a block diagram showing a configuration of a self-routing apparatus of an optical packet according to a second embodiment of the invention.

FIG. 4 shows a configuration of a self-routing apparatus of an optical packet according to a second embodiment of the present invention. Hereinafter, by referring to FIG. 4, description is made of the configuration and an operation of the optical packet self-routing apparatus of the embodiment.

In the embodiment, the self-routing apparatus of the optical packet is composed of portions d to j. The portion j includes portions 46, 49 and $4c$.

The portion d includes an input port 10, an optical copying mechanism 11, a channel route 4, a control system route 5, and a wavelength multiplexing mechanism 6. The channel route 4 has an optical delaying mechanism 12. The control system route 5 has an optic/electric converting mechanism 13, an address information extracting mechanism 14, and a control light generating mechanism 15. The portions e and f are similar in configuration to the portion d.

The portion 46 includes interfaces 17 and if, transmission lines 19 and $1a$, a wavelength demultiplexing mechanism 18, a third nonlinear optical effect device $1b$, optical wavelength converting devices $1c0$ to $1c2$, and a wavelength multiplexing mechanism $1e$. The portions 49 and $4x$ are similar in configuration to the portion 46.

The portion g includes a wavelength demultiplexing mechanism $1g$, optic/electric converting mechanisms $1h0$ to $1h2$, buffers $1i0$ to $1i2$, a multiplexing mechanism $1j$, an electric/optic converting mechanism $1k$, and an output port $1r$. The portions h and i are similar in configuration to the portion g.

A transmission line $1d0$ connects the optical wavelength converting device $1c0$ with the wavelength multiplexing mechanism $1e$; a transmission line $1d1$ connects the optical wavelength converting device $1c1$ with the wavelength multiplexing mechanism $2e$; and a transmission line $1d2$ connects the optical wavelength converting device $1c2$ with the wavelength multiplexing mechanism $3e$.

A transmission line $2d0$ connects the optical wavelength converting device $2c0$ with the wavelength multiplexing mechanism $1e$; a transmission line $2d1$ connects the optical wavelength converting device $2c1$ with the wavelength multiplexing mechanism $2e$; and a transmission line $2d2$ connects the optical wavelength converting device $2c2$ with the wavelength multiplexing mechanism $3e$.

A transmission line $3d0$ connects the optical wavelength converting device $3c0$ with the wavelength multiplexing mechanism $1e$; a transmission line $3d1$ connects the optical wavelength converting device $3c1$ with the wavelength multiplexing mechanism $2e$; and a transmission line $3d2$ connects the optical wavelength converting device $3c2$ with the wavelength multiplexing mechanism $3e$.

The input ports 10, 20 and 30 receive optical packets. The optical copying mechanisms 11, 21 and 31 copy the optical packets entered to the input ports 10, 20 and 30, respectively. Each of the optical packets copied by the optical copying mechanisms 11, 21 and 31 is entered to a two-way route, i.e., one way being composed of each of the optical delaying mechanisms 12, 22 and 32, and the other being composed of each of the optic/electric converting mechanisms 13, 23 and 33.

The channel routes 4, 7 and a respectively including the optical delaying mechanisms 12, 22 and 32 are provided to pass optical packets containing channel data. The control system route 5 including the optic/electric converting mechanism 13, the address information extracting mechanism 14, and the control light generating mechanism 15 is provided to generate and pass control data (e.g., control light for controlling the third nonlinear optical effect device $1b$). The control system route 8 including the optic/electric converting mechanism 23, the address information extracting mechanism 24, and the control light generating mechanism 25, and the control system route b including the optic/electric converting mechanism 33, the address information extracting mechanism 34, and the control light generating mechanism 35 are similar in configuration to the control system route 5.

The optical delaying mechanisms 12, 22 and 32 delay optical packets by predetermined time in order to synchronize the optical packets outputted from the channel routes 4, 7 and a with control lights outputted from the control light generating mechanisms 15, 25 and 35. For example, the optical delaying mechanisms 12, 22 and 32 may be delay lines made of optical fibers.

The optic/electric converting mechanisms 13, 23, 33, $1h0$ to $1h2$, $2h0$ to $2h2$, and $3h0$ to $3h2$ convert optical signals into electric signals. The address information extracting mechanisms 14, 24 and 34 extract address information recorded in headers of the packets converted into electric signals by the optic/electric converting mechanisms 13, 23 and 33. The control light generating mechanisms 15, 25, and 35 generate control lights for controlling the third nonlinear optical effect devices $1b$, $2b$ and $3b$ based on the address information of the packets extracted by the address information extracting mechanisms 14, 24 and 34.

The wavelength multiplexing mechanism 16 multiplexes a wavelength of the optical packet passed through the channel route 4 with that of the control light generated by the control light generating mechanism 15. Similarly, the wavelength multiplexing mechanism 26 multiplexes a wavelength of the optical packet passed through the channel route 7 with that of the control light generated by the control light generating mechanism 25. Also, similarly, the wavelength multiplexing mechanism 36 multiplexes a wavelength of the optical packet passed through the channel route a with that of the control light generated by the control light generating mechanism 35. The wavelength of the optical packet passed through the channel route is different from that of the control light.

The wavelength demultiplexing mechanisms 18, 28 and 38 demultiplex the optical wavelengths respectively multiplexed by the wavelength multiplexing mechanisms 16, 26 and 36 are demultiplexed into wavelengths of the optical packets and the control lights. The demultiplexed optical packets and the control lights are entered to the third nonlinear optical effect device.

The third nonlinear optical effect devices $1b$, $2b$ and $3b$ refract the optical packets entered from the wavelength demultiplexing mechanisms 18, 28 and 38 through the transmission lines 19, 29 and 39 in predetermined directions based on the control lights respectively generated by the control light generating mechanisms 15, 25 and 35, and entered from the wavelength demultiplexing mechanisms 18, 28 and 38 through the transmission lines $1a$, $2a$ and $3a$. In other words, the third nonlinear optical effect device $1b$ refracts the optical packets such that the optical packets can be entered to one of the optical wavelength converting devices $1c0$ to $1c2$. Similarly, the third nonlinear optical effect device $2b$ refracts the optical packets such that the optical packets can be entered to one of the optic/electric converting mechanisms $2c0$ to $2c2$, and the third nonlinear optical effect device $3b$ refracts the optical packets such that the optical packets can be entered to one of the optic/electric converting mechanisms $3c0$ to $3c2$.

The optical wavelength converting devices $1c0$ to $1c2$, $2c0$ to $2c2$, and $3c0$ to $3c2$ convert wavelengths of entered optical packets into predetermined wavelengths. A function of the optical wavelength converting device may be achieved by, for example carrying out four-wave mixing for the nonlinear optical effect device. The four-wave mixing is a phenomenon, where when a pump light and a probe light are entered to the nonlinear-optical effect device, lights converted for wavelengths are outputted to symmetrical position of a wavelength of the probe light around the wavelength of the probe light (described in "Nearly Degenerate Four-Wave Mixing in a Traveling-Wave Semiconductor Laser Amplifier" by Takaaki Mukai, and Tadashi Saitoh, published by IEICE Technical Report, OQE88- 34, 1988).

Optical packets outputted from the optical wavelength converting devices $1c0$ to $1c2$, $2c0$ to $2c2$, and $3c0$ to $3c2$ are entered to the wavelength multiplexing mechanisms $1e$, $2e$ and $3e$. Conversion of wavelengths of the optical packets in the optical wavelength converting devices $1c0$ to $1c2$, $2c0$ to $2c2$, and $3c0$ to $3c2$ suppresses mixing of the optical packets of equal wavelengths in the wavelength multiplexing mechanisms $1e$, $2e$ and $3e$.

The wavelength multiplexing mechanism $1e$ multiplexes wavelengths of the optical packets outputted from the optical wavelength converting devices $1c0$, $2c0$, and $3c0$. Similarly, the wavelength multiplexing mechanism $2e$ multiplexes wavelengths of the optical packets outputted from the optical wavelength converting devices $1c1$, $2c1$, and $3c1$. Also, similarly, the wavelength multiplexing mechanism $3e$ multiplexes wavelengths of the optical packets outputted from the optical wavelength converting devices $1c2$, $2c2$, and $3c2$.

The wavelength demultiplexing mechanisms $1g$, $2g$ and $3g$ demultiplex wavelengths of the optical packets entered from the wavelength multiplexing mechanisms $1e$, $2e$ and $3e$, respectively.

The optic/electric converting mechanisms $1h0$ to $1h2$ convert the optical packets entered from the wavelength demultiplexing mechanism $1g$ into electric packets. The buffers $1i0$, $1i1$ and $1i2$ temporarily store the packets converted into the electric signals by the optic/electric converting mechanisms $1h0$, $1h1$ and $1h2$, respectively.

Similarly, the optic/electric converting mechanisms $2h0$ to $2h2$ convert the optical packets entered from the wavelength demultiplexing mechanism $2g$ into electric signals. The buffers $2i0$, $2i1$ and $2i2$ temporarily store the packets converted into the electric signals by the optic/electric converting mechanism $2h0$, $2h1$ and $2h2$, respectively.

Also, similarly, the optic/electric converting mechanisms $3h0$ to $3h2$ convert the optical packets entered from the wavelength demultiplexing mechanism $3g$ into electric signals. The buffers $3i0$, $3i1$ and $3i2$ temporarily store the packets converted into the electric signals by the optic/electric converting mechanism $3h0$ to $3h2$, respectively.

The multiplexing mechanism 1*j* adjusts and multiplexes a packet addressed to the output port 1*r*. Similarly, the multiplexing mechanisms 2*j* and 3*j* respectively adjust and multiplex packets addressed to the output ports 2*r* and 3*r*.

The electric/optic converting mechanisms 1*k*, 2*k* and 3*k* convert electric packets outputted from the multiplexing mechanisms 1*j*, 2*j* and 3*j* into optical packets. The packets converted into the optical packets by the electric/optic converting mechanisms 1*k*, 2*k* and 3*k* are respectively outputted from the output ports 1*r*, 2*r* and 3*r*.

The interfaces 17, 27 and 37 are for input sides of the respective portions 46, 49 and 4*c*. The interfaces if, 2*f* and 3*f* are for output sides of the respective portions 46, 49 and 4*c*.

The transmission lines 19, 29 and 39 are lines through which optical packets demultiplexed by the wavelength demultiplexing mechanisms 18, 28 and 38 are passed when they are made incident on the third nonlinear optical effect devices In, 2*b* and 3*b*, respectively.

The transmission lines 1*a*, 2*a* and 3*a* are lines through which control lights demultiplexed by the wavelength demultiplexing mechanisms 18, 28 and 38 are passed when they are made incident on the third nonlinear optical effect devices 1*b*, 2*b* and 3*b*, respectively.

Unless specified otherwise, the third nonlinear optical effect device of the embodiment is similar in configuration and operation to the third nonlinear optical effect device of the first embodiment of the invention shown in FIGS. 2(*a*) to 2(*c*).

In the embodiment, the output ports Out α, β and γ of the third nonlinear optical effect device 1*b* are respectively connected to the optical wavelength converting devices 1*c*0, 1*c*1 and 1*c*2.

Similarly, in the embodiment, the output ports Out α, β and γ of the third nonlinear optical effect device 2*b* are respectively connected to the optical wavelength converting devices 2*c*0, 2*c*1 and 2*c*2.

Also, similarly, in the embodiment, the output ports Out α, β and γ of the third nonlinear optical effect device 3*b* are respectively connected to the optical wavelength converting devices 3*c*0, 3*c*1 and 3*c*2.

Figure 9:
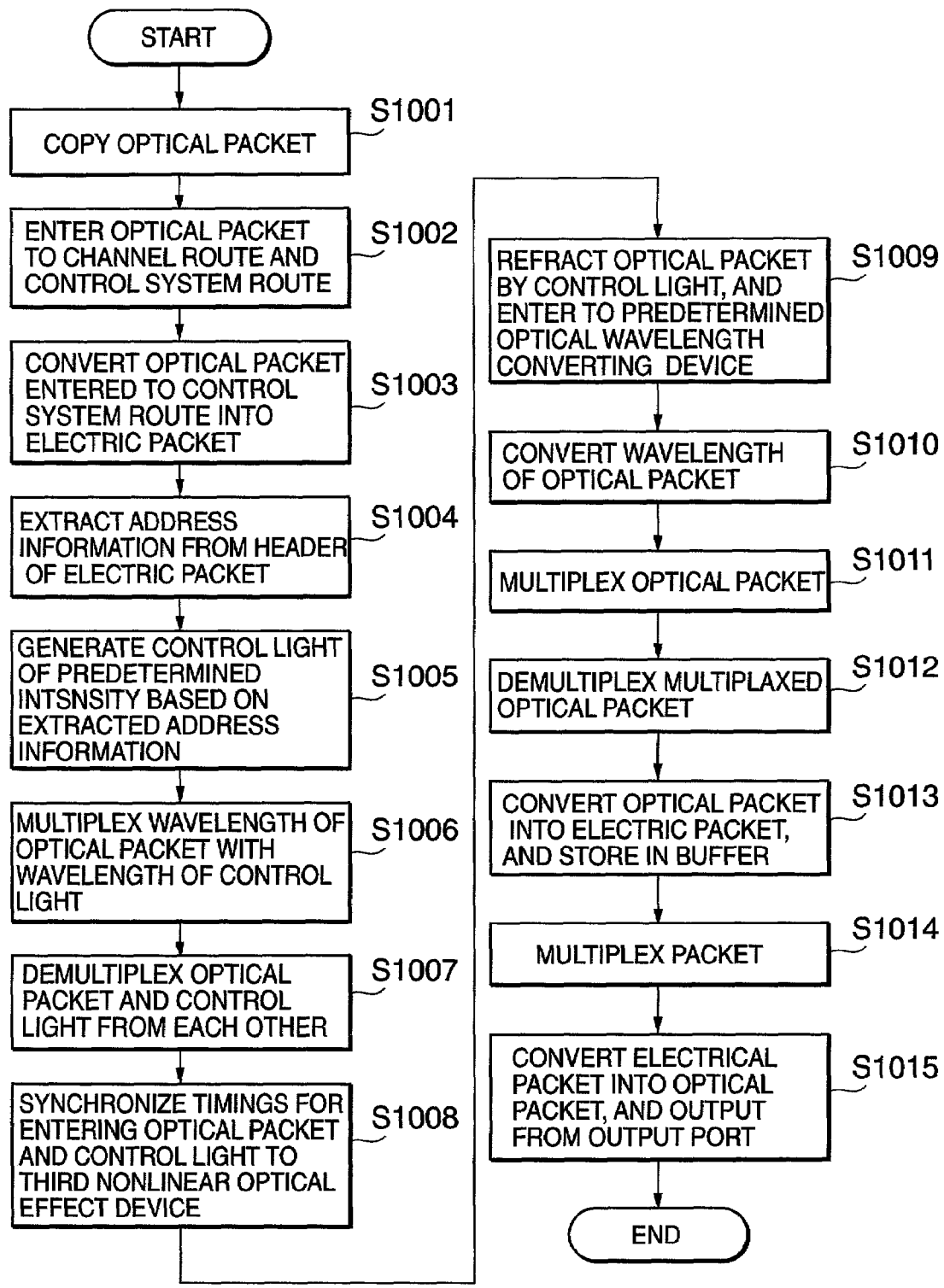
FIG. 9 is a flowchart showing an operational flow of the self-routing apparatus of the optical packet of the second embodiment of the invention.

FIG. 9 is a flowchart showing an operational flow of the optical packet self-routing apparatus according to the second embodiment of the invention. Hereinafter, assuming that the optical packet of the embodiment is similar in structure to the optical packet of the first embodiment of the invention shown in FIG. 3, by referring to FIGS. 3 and 4, and along FIG. 9, description is made of the operation of the optical packet self-routing apparatus of the second embodiment of the invention.

The portions e and f of the optical packet self-routing apparatus shown in FIG. 4 are similar in configuration to the portion d, and similarly operated. Thus, hereinafter, description is made of the operation of the optical packet self-routing apparatus of the embodiment focusing on the configuration and the operation of the portion d.

When the optical packets x to z are continuously entered to the input port 10 in this order, the optical packet x is copied by the optical copying mechanism 11 (step S1001). The optical packet x copied by the optical copying mechanism 11 becomes two in number, and then severally entered to the channel route 4 and the control system route 5 (step S1002).

The optical packet x entered to the control system route 5 is converted into an electric packet by the optic/electric converting mechanism 13, being converted into an electric packet x (step S1003). The electric packet x obtained by the conversion at the optic/electric converting mechanism 13 is entered to the address information extracting mechanism 14.

The address information extracting mechanism 14 reads address information recorded in a header of the entered electric packet x (step S1004). The address information contains information on an output port to which the optical packet x is outputted, or the like. The address information extracting mechanism 14 recognizes that an output destination of the optical packet x is the output port 1*r*. In addition, the address information extracting mechanism 14 controls and drives the control light generating mechanism 15 based on the recognized output destination of the optical (electric) packet x, i.e., the output port 1*r*, such that the optical (electric) packet x can be outputted from the output port 1*r*.

The control light generating mechanism 15 generates a control light of an intensity α such that the optical packet x can be entered from the third nonlinear optical effect device 1*b* to the optical wavelength converting device 1*c*0 (step S1005).

The wavelength multiplexing mechanism 16 multiplexes a wavelength of the optical packet x passed through the channel route 4 with a wavelength of the control light of the intensity α generated by the control light generating mechanism 15 (step S1006). In order to suppress mixing of the wavelengths during the multiplexing, the wavelengths of the optical packet x and the control light are preset to be different from each other.

The wavelength demultiplexing mechanism 18 demultiplexes the optical wavelength multiplexed by the wavelength multiplexing mechanism 16 into the optical packet x and the control light (step S1007).

The demultiplexed optical packet x and control light are entered to the third nonlinear optical effect device 1*b*. During the entry, by using the optical delaying mechanism 12, a timing for entering the optical packet x to the third nonlinear optical effect device 1*b* is synchronized with a timing for making the control light incident on the third nonlinear optical effect device 1*b* (step S1008).

A refractive index in the third nonlinear optical effect device 1*b* is set based on the control light of the intensity α made incident. The optical packet x entered through the channel route 4 to the third nonlinear optical effect device 1*b* is refracted based on the above-described refractive index, and outputted from the output port Out α of the third nonlinear optical effect device 1*b*. The optical packet x outputted from the output port Out α of the third nonlinear optical effect device 1*b* is entered to the optical wavelength converting device 1*c*0 (step S1009).

The optical wavelength converting device 1*c*0 converts a wavelength of the entered optical packet x into a predetermined wavelength (step S1010). The optical packet subjected to the wavelength conversion by the optical wavelength converting device 1*c*0 is entered to the wavelength multiplexing mechanism 1*e*.

In addition to the optical packet x subjected to the wavelength conversion by the optical wavelength converting device 1*c*0, the wavelength multiplexing mechanism 1*e* receives optical packets subjected to wavelength conversion by the optical wavelength converting devices 2*c*0 and 3*c*0. By converting the wavelengths of the optical packets to be difference from one another with the optical wavelength converting devices 1*c*0, 2*c*0 and 3*c*0, it is possible to suppress mixing of the wavelengths of the optical packets when the optical packets entered from the optical wavelength converting devices 1*c*0, 2*c*0 and 3*c*0 are multiplexed by the wavelength multiplexing mechanism 1*e*.

Similarly, by converting the wavelengths of the optical packets to be different from one another with the optical wavelength converting devices $1c1$, $2c1$ and $3c1$, it is possible to suppress mixing of the wavelengths of the optical packets when the optical packets entered from the optical wavelength converting devices $1c1$, $2c1$ and $3c1$ are multiplexed by the wavelength multiplexing mechanism $2e$.

Also, similarly, by converting the wavelengths of the optical packets to be different from one another with the optical wavelength converting devices $1c2$, $2c2$ and $3c2$, it is possible to suppress mixing of the wavelengths of the optical packets when the optical packets entered from the optical wavelength converting devices $1c2$, $2c2$ and $3c2$ are multiplexed by the wavelength multiplexing mechanism $3e$.

As described above, the wavelengths of the optical packets transmitted through the transmission lines $1d0$, $2d0$ and $3d0$ connected to the input side of the wavelength multiplexing mechanism $1e$ must be different from one another. Similarly, the wavelength's of the optical packets transmitted through the transmission lines $1d1$, $2d1$ and $3d1$ of the input side of the wavelength multiplexing mechanism $2e$, and the wavelengths of the optical packets transmitted through the transmission lines $1d2$, $2d2$ and $3d2$ of the input side of the wavelength multiplexing mechanism $3e$ must be different from one another.

For example, when wavelengths of optical packets are converted into wavelengths $\lambda 1$, $\lambda 2$ and $\lambda 3$ respectively by the optical wavelength converting devices $1c0$, $1c1$ and $1c2$ provided in the output side of the third nonlinear optical effect device $1b$, the optical wavelength converting devices provided in the output sides of the third nonlinear optical effect devices $2b$ and $3b$ need only to convert wavelengths of the optical packets into values obtained by rotating the wavelengths $\lambda 1$, $\lambda 2$ and $\lambda 3$. That is, when wavelengths of optical packets are converted into wavelengths $\lambda 1$, $\lambda 2$ and $\lambda 3$ respectively by the optical wavelength converting devices $1c0$, $1c1$ and $1c2$, wavelengths are converted into wavelengths $\lambda 2$, $\lambda 3$ and $\lambda 1$ respectively by the optical wavelength converting devices $2c0$, $2c1$ and $2c2$; and into wavelengths $\lambda 3$, $\lambda 1$ and $\lambda 2$ respectively by the optical wavelength converting devices $3c0$, $3c1$ and $3c2$.

The wavelength multiplexing mechanism $1e$ multiplexes the optical packets converted for wavelengths by the optical wavelength converting devices $1c0$, $2c0$ and $3c0$. Similarly, the wavelength multiplexing mechanism $2e$ multiplexes the optical packets converted for wavelengths by the optical wavelength converting devices $1c1$, $2c1$ and $3c1$; and the wavelength multiplexing mechanism $3e$ multiplexes the optical packets converted for wavelengths by the optical wavelength converting devices $1c2$, $2c2$ and $3c2$ (step S1011).

The optical packets multiplexed by the wavelength multiplexing mechanisms $1e$, $2e$ and $3e$ are respectively sent from the interfaces $1f$, $2f$ an $3f$, and transmitted to the wavelength demultiplexing mechanisms $1g$, $2g$ and $3g$.

The wavelength demultiplexing mechanisms $1g$, $2g$ and $3g$ demultiplex the multiplexed optical packets into the optical packets before the multiplexing (step S1012). The optical packets (including the optical packet x) demultiplexed by the wavelength demultiplexing mechanism $1g$ are sent to the optic/electric converting mechanisms $1h0$ to $1h2$. Similarly, the optical packets demultiplexed by the wavelength demultiplexing mechanism $2g$ are sent to the optic/electric converting mechanisms $2h0$ to $2h2$. Also, similarly, the optical packets demultiplexed by the wavelength demultiplexing mechanism $3g$ are sent to the optic/electric converting mechanisms $3h0$ to $3h2$.

The packets (including an electric packet x resulted from the conversion of the optical packet x) converted into electric packets by the optic/electric converting mechanisms $1h0$, $1h1$ and $1h2$ are respectively sent to the buffers $1i0$, $1i1$ and $1i2$, and stored (step S1013). Similarly, the packets converted into electric packets by the optic/electric converting mechanisms $2h0$, $2h1$ and $2h2$ are respectively sent to the buffers $2i0$, $2i1$ and $2i2$, and stored. Further, the packets converted into electric packets by the optic/electric converting mechanisms $3h0$, $3h1$ and $3h2$ are respectively sent to the buffers $3i0$, $3i1$ and $3i2$, and stored.

When optical packets entered to a plurality of input ports are outputted from the same output port, the optical packets may clash with each other in a route from the plurality of input ports to a single output port. However, by temporarily storing the packets in the buffer as described above, it is possible to prevent clashing of the packets with each other.

The electric packets including the electric packet x are entered from the buffer $1i0$ to the multiplexing mechanism $1j$. The multiplexing mechanism $1j$ receives and multiplexes the packets from the buffers $1i0$, $1i1$ and $1i2$ in a manner of adjusting the packets so as to prevent clashing thereof (step S1014). Similarly, the multiplexing mechanism $2j$ receives and multiplexes the packets from the buffers $2i0$, $2i1$ and $2i2$ in a manner of adjusting the packets so as to prevent clashing thereof. Further, the multiplexing mechanism $3j$ receives and multiplexes the packets from the buffers $3i0$, $3i1$ and $3i2$ in a manner of adjusting the packets so as to prevent clashing thereof.

The multiplexing mechanisms $1j$, $2j$ and $3j$ respectively send the multiplexed packets to the electric/optic converting mechanisms $1k$, $2k$ and $3k$. Each electric packet entered to the electric/optic converting mechanism $1k$ is converted into an optical packet, and outputted from the output port $1r$ (step S1015). Similarly, the packets converted into the optical packets by the electric/optic converting mechanisms $2k$ and $3k$ are respectively outputted from the output ports $2r$ and $3r$.

As in the case of the optical packet x, the optical packet y is entered through the optical copying mechanism $11$, the channel route $4$, the wavelength multiplexing mechanism $16$, and the wavelength demultiplexing mechanism $18$ to the third nonlinear optical effect device $1b$. Based on address information recorded in the header of the optical (electric) packet y, i.e., the output port $3r$, the optical packet y is entered to the optical wavelength converting device $1c2$, subjected to wavelength conversion, passed through the wavelength multiplexing mechanism $3e$ and the wavelength demultiplexing mechanism $3g$, and then converted into an electric packet y by one of the optic/electric converting mechanisms $3h0$ to $3h2$. The electric packet y is stored in one of the buffers $3i0$ to $3i2$. The electric packet y is multiplexed with the other packets by the multiplexing mechanism $3j$, converted into an optical packet by the electric/optic converting mechanism $3k$, and then outputted from the output port $3r$.

As in the case of the optical packet x, the optical packet z is entered through the optical copying mechanism $11$, the channel route $4$, the wavelength multiplexing mechanism $16$, and the wavelength demultiplexing mechanism $18$ to the third nonlinear optical effect device $1b$. Based on address information recorded in the header of the optical (electric) packet z, i.e., the output port $2r$, the optical packet z is entered to the optical wavelength converting device $1c1$, subjected to wavelength conversion, passed through the wavelength multiplexing mechanism $2e$ and the wavelength demultiplexing mechanism $2g$, and then converted into an electric packet y by one of the optic/electric converting mechanisms $2h0$ to $2h2$. The electric packet z is stored in one of the buffers $2i0$ to $2i2$. The electric packet z is multiplexed with the other packets by the multiplexing mechanism $2j$, converted into an optical packet by the electric/optic converting mechanism $2k$, and then outputted from the output port $2r$.

Figure 5:
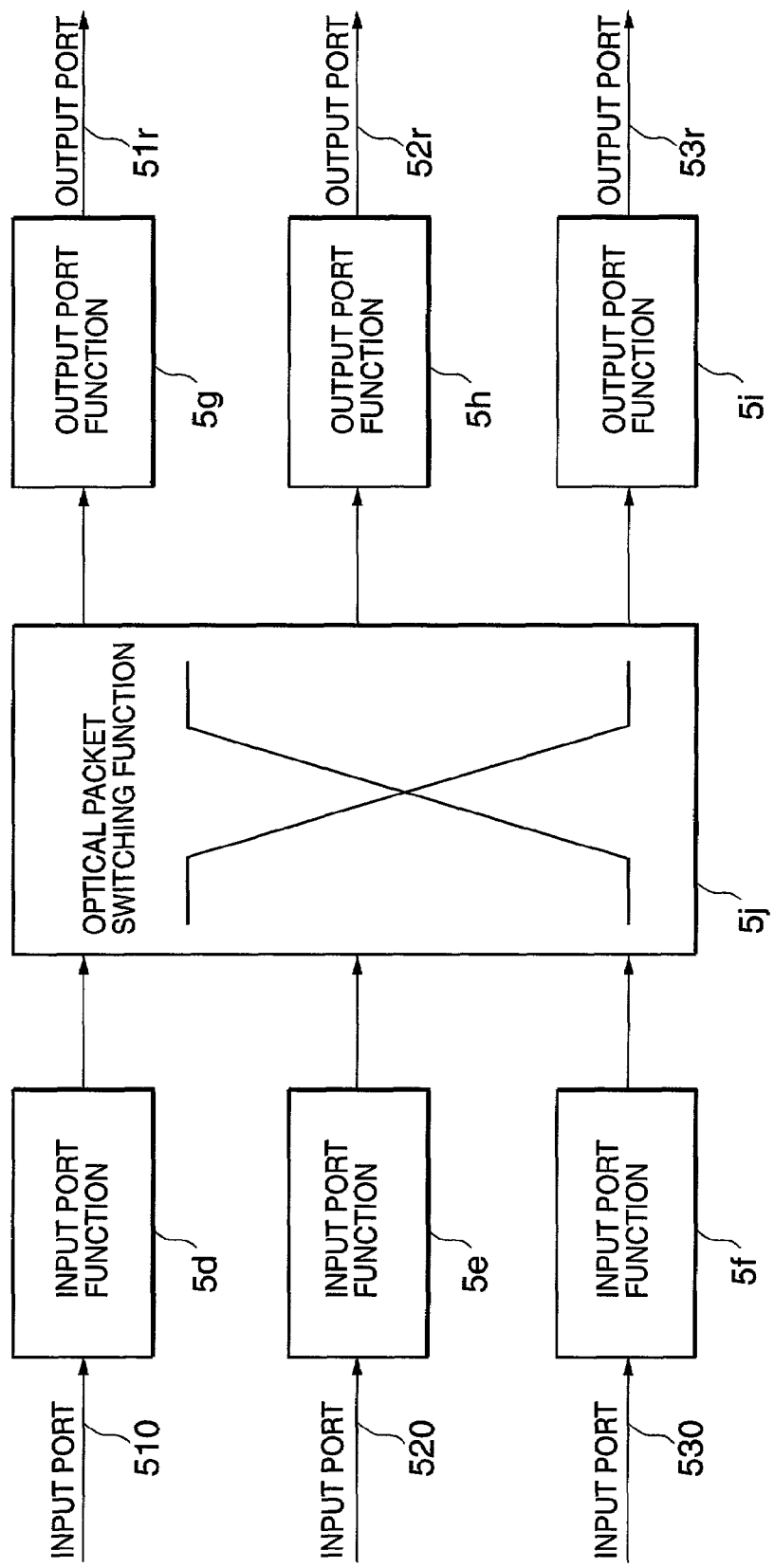
FIG. 5 is a view showing a functional configuration of the self-routing apparatus of the optical packet according to the second embodiment of the invention.

FIG. 5 shows a functional configuration of the optical packet self-routing apparatus of the second embodiment of the invention. Hereinafter, by referring to FIGS. 4 and 5, description is made of the functional configuration of the optical packet self-routing apparatus of the embodiment.

The optical packet self-routing apparatus shown in FIG. 5 includes input ports 510, 520 and 530, input port functions $5d$, $5e$ and $5f$, an optical packet switching function $5j$, output port functions $5g$, $5h$ and $5i$, and output ports $51r$, $52r$ and $53r$.

The input ports 10, 20 and 30 shown in FIG. 4 are respectively equivalent to the input ports 510, 520 and 530 of FIG. 5. The output ports $1r$, $2r$ and $3r$ shown in FIG. 4 are respectively equivalent to the input ports $51r$, $52r$ and $53r$ of FIG. 5.

The portions d, e and f shown in FIG. 4 are respectively equivalent to the input port functions $5d$, $5e$ and $5f$ of FIG. 5. The portions g, h and i shown in FIG. 4 are respectively equivalent to the output port functions $5g$, $5h$ and $5i$ of FIG. 5. Also, the portion j shown in FIG. 4 is equivalent to the optical packet switching function $5j$ of FIG. 5.

By achieving transmission of packets and control signals through a route connecting the portion j with the other portions (d to i) in FIG. 4 based on wavelength-multiplexed optical signals, it is possible to remove limitations imposed on transmission distances of electric signals between the portion j and the other portions. In other words, it is possible to secure independence of each of the input port functions $5d$ to $5f$, the output port functions $5g$ to $5i$, and the optical packet switching function $5j$ shown in FIG. 5.

The optical packet self-routing apparatus of the embodiment is an optical packet self-routing apparatus of 3×3, which has three input ports and three output ports. However, the numbers of input and output ports can be arbitrarily set. In addition, the number of various portions provided in the optical packet self-routing apparatus is decided according to the numbers of input and output ports. In such a case, a value of a wavelength converted by each optical wavelength converting device is prepared according to the number of output ports, and a wavelength of an optical packet entered to each optical wavelength converting device is converted cyclically as in the above-described embodiment.

As an example, hereinafter, description is made of an optical packet self-routing apparatus of M×N, which has M pieces of input ports from first to M-th (M is an integer of 1 or higher), and N pieces of output ports from first to N-th (N is an integer of 2 or higher). An optical wavelength converting device for converting a wavelength of an optical packet entered to an X-th (X is an integer of $\geq 1$ to $\leq M$) input port, and outputted from a Y-th (Y is an integer of $\geq 1$ to $\leq M$) output port is set as an optical wavelength converting device XcY.

It is now assumed that optical packets entered to the first input port are respectively converted into $\lambda 1$, $\lambda 2$, $\lambda 3$, ..., $\lambda N-2$, $\lambda N-1$, and $\lambda N$ by the optical wavelength converting devices $1c1$, $1c2$, $1c3$, ..., $1c(N-2)$, $1c(N-1)$, and $1cN$.

If the optical packets entered to the first input port are converted in the above-described manner, optical packets entered to the 2nd input port are respectively converted into $\lambda 2$, $\lambda 3$, ..., $\lambda N-2$, $\lambda N-1$, $\lambda N$, and $\lambda 1$ by the optical wavelength converting devices $2c1$, $2c2$, ..., $2c(N-3)$, $2c(N-2)$, $2c(N-1)$ and $2cN$.

Similarly, if the optical packets entered to the first input port are converted in the above-described manner, optical packets entered to the 3rd input port are respectively converted into $\lambda 3$, $\lambda 4$, ..., $\lambda N-1$, $\lambda N$, $\lambda 1$, and $\lambda 2$ by the optical wavelength converting devices $3c1$, $3c2$, ..., $3c(N-3)$, $3c(N-2)$, $3c(N-1)$ and $3cN$.

Similarly, if the optical packets entered to the first input port are converted in the above-described manner, optical packets entered to the (M−1)-th input port are respectively converted into $\lambda N-1$, $\lambda N$, $\lambda 1$, $\lambda 2$, ..., $\lambda N-3$, and $\lambda N-2$ by the optical wavelength converting devices $(M-1)c1$, $(M-1)c2$, $(M-1)c3$, $(M-1)c4$, ..., $(M-1)c(N-1)$, and $(M-1)cN$.

Also, similarly, if the optical packets entered to the first input port are converted in the above-described manner, optical packets entered to the M-th input port are respectively converted into $\lambda N$, $\lambda 1$, $\lambda 2$, $\lambda 3$, ..., $\lambda N-2$, and $\lambda N-1$ by the optical wavelength converting devices Mc1, Mc2, Mc3, Mc4, ..., Mc(N−1), and McN.

As described above, according to the embodiment, by switching the optical packets in the portions 46, 49 and 4c through optical processing (no electrical processing), it is possible to remove limitations imposed on the transmission distance of an electric signal.

Also, according to the embodiment, by multiplexing the wavelengths of the optical packets with those of the control lights, and transmitting the multiplexed optical signals respectively from the portions d, e and f to the portions 46, 49 and 4c, it is possible to remove limitations imposed on the transmission distance of an electric signal, and to prevent phase deviation between an optical packet and a control light when they are entered to the third nonlinear optical effect device.

The removal of the limitations on the transmission distance on the electric signal, and the prevention of the phase deviation between the optical packet and the control light upon the entry to the third nonlinear optical effect device can also be achieved by using light parallel transmitting mechanisms 116, 118, 126, 128 136 and 138 shown in FIG. 11. In a fourth embodiment of the invention shown in FIG. 11, as such a light parallel transmitting mechanism, for example, a fiber array having optical transmission lines of equal lengths installed in parallel, or the like can be used. In addition, the wavelength multiplexing mechanisms $1e$, $2e$ and $3e$, and the wavelength demultiplexing mechanisms $1g$, $2g$ and $3g$ shown in FIG. 4 can also be changed to light parallel transmitting mechanisms $11e$, $12e$, $13e$, $11g$, $12g$ and $13g$ shown in FIG. 11. Accordingly, by using the light parallel transmitting mechanisms lower in price than the wavelength demultiplexing/multiplexing mechanisms, it is possible to reduce costs of the apparatus.

Furthermore, according to the embodiment, based on the cyclical values of the wavelengths of the optical packets converted by the light wavelength converting devices $1c0$ to $1c1$, the wavelengths of the optical packets are converted by the optical length converting devices $2c0$ to $2c1$ and $3c0$ to $3c1$, and accordingly the number of values of converted wavelengths can be reduced. As a result, it is possible to achieve a simple configuration of the apparatus.

Figure 6:
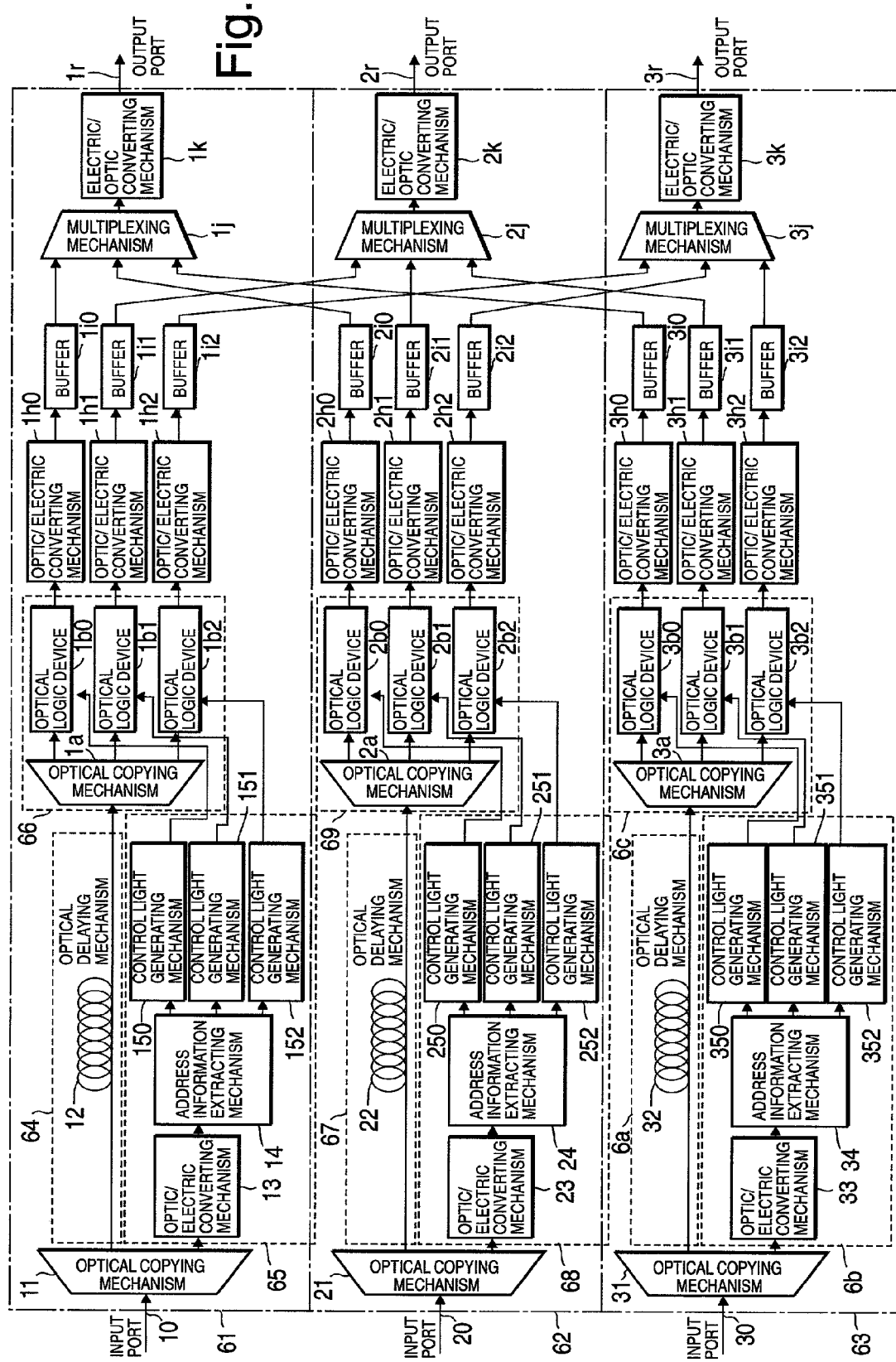
FIG. 6 is a block diagram showing a configuration of a self-routing apparatus of an optical packet according to a third embodiment of the invention.
Figure 7:
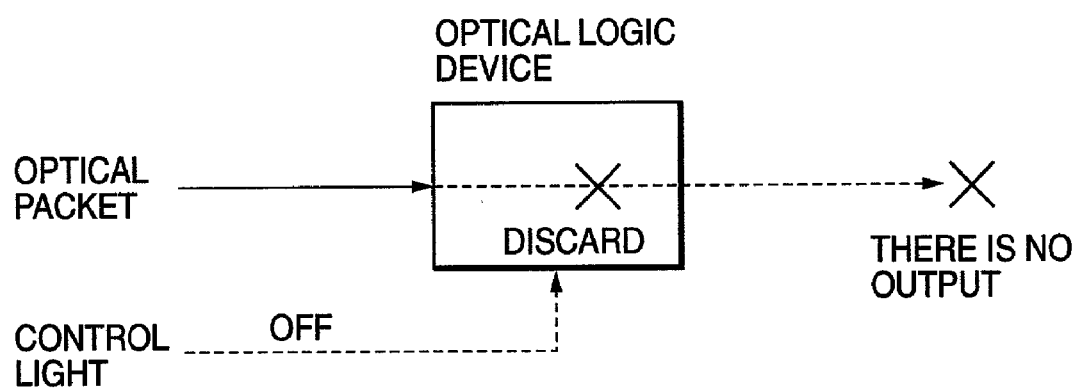
Figure 7:
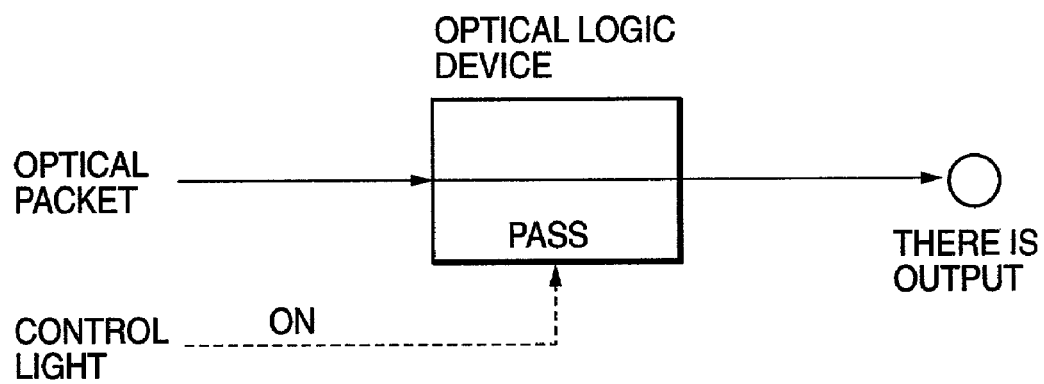

FIG. 6 shows a configuration of a self-routing apparatus of an optical packet according to a third embodiment of the present invention. Hereinafter, by referring to FIG. 6, description is made of the configuration and an operation of the optical packet self-routing apparatus of the embodiment.

In the embodiment, the self-routing apparatus of the optical packet is composed of portions 61, 62 and 63.

The portion 61 includes an input port 10, an optical copying mechanism 11, a channel route 64, a control system route 65, a portion 66, optic/electric converting mechanisms 1h0 to 1h2, buffers 1i0 to 1i2, a multiplexing mechanism 1j, an electric/optic converting mechanism 1k, and an output port 1r. The channel route 64 has an optical delaying mechanism 12. The control system route 65 has an optic/electric converting mechanism 13, an address information extracting mechanism 14, and control light generating mechanisms 150 to 152. The portion 64 has an optical copying mechanism 1a, and optical logic devices 1b0 to 1b2.

The portions 62 and 63 are similar in configuration to the portion 61.

The input ports 10, 20 and 30 receive optical packets. The optical copying mechanisms 11, 21 and 31 copy the optical packets entered to the input ports 10, 20 and 30, respectively. Each of the optical packets copied by the optical copying mechanisms 11, 21 and 31 is entered to a two-way route, i.e., one way being composed of each of the optical delaying mechanisms 12, 22 and 32, and the other being composed of each of the optic/electric converting mechanisms 13, 23 and 33.

The channel routes 64, 67 and 6a respectively including the optical delaying mechanisms 12, 22 and 32 are provided to pass optical packets containing channel data. The control system route 65 including the optic/electric converting mechanism 13, the address information extracting mechanism 14, and the control light generating mechanisms 150 to 152 is provided to generate and pass a control light for controlling the optical logic devices 1b0 to 1b2. The control system route 68 including the optic/electric converting mechanism 23, the address information extracting mechanism 24, and the control light generating mechanisms 250 to 252, and the control system route 6b including the optic/electric converting mechanism 33, the address information extracting mechanism 34, and the control light generating mechanisms 350 to 352 are similar in configuration to the control system route 65.

The optical delaying mechanisms 12, 22 and 32 delay optical packets by predetermined time in order to synchronize the optical packets with control lights made incident on the optical logic devices 1b0 to 1b2, 2b0 to 2b2, and 3b0 to 3b2. For example, the optical delaying mechanisms 12, 22 and 32 may be delay lines made of optical fibers.

The optic/electric converting mechanisms 13, 23, 33, 1h0 to 1h2, 2h0 to 2h2, and 3h0 to 3h2 convert optical signals into electric signals.

The address information extracting mechanism 14 extracts address information recorded in a header of the packet converted into the electric signal by the optic/electric converting mechanism 13. Based on the extracted address information, the address information extracting mechanism 14 drives one of the control light generating mechanisms 150 to 152 to generate a control light for controlling one of the optical logic devices 1b0 to 1b2.

For example, if address information of a packet extracted by the address information extracting mechanism 14 is "output port 1r", the address information extracting mechanism 14 drives the control light generating mechanism 150 to generated a control light. If address information is "output port 2r", the address information extracting mechanism 14 drives the control light generating mechanism 151 to generate a control light; if address information is "output port 3r", the address information extracting mechanism 14 drives the control light generating mechanism 152 to generate a control light.

Also, the address information extracting mechanisms 24 and 34 are operated similarly to the address information extracting mechanism 14 to drive control light generating mechanisms 250 to 252, and 350 to 352 to generate control lights.

In addition, as in the case of the address information extracting mechanism 14, based on extracted address information, the address information extracting mechanism 24 drives one of the control light generating mechanisms 250 to 252 to generate control lights for controlling the optical logic devices 2b0 to 2b2, and the address information extracting mechanism 34 drives one of the control light generating mechanisms 350 to 352 to generate control lights for controlling the optical logic devices 3b0 to 3b2.

The optical copying mechanisms 1a, 2a and 3a copy optical packets passed through the channel routes 64, 67 and 6a, respectively. The optical packets copied by the optical copying mechanism 1a are entered to the optical logic devices 1b0 to 1b2. Similarly, the optical packets copied by the optical copying mechanism 2a are entered to the optical logic devices 2b0 to 2b2. The optical packets copied by the optical copying mechanism 3a are entered to the optical logic devices 3b0 to 3b2.

The optical logic devices 1b0 to 1b2, 2b0 to 2b2, and 3b0 to 3b2 pass the optical packets when entry of optical packets and incidence of control lights generated based on the optical packets are simultaneously detected, and discard the optical packets when incidence of the control lights is not detected.

The optic/electric converting mechanisms 1h0, 1h1 and 1h2 convert the optical packets passed through the optical logic converting mechanisms 1b0, 1b1 and 1b2 into electric signals, respectively. The packets converted into the electric signals by the optic/electric converting mechanisms 1h0, 1h1 and 1h2 are temporarily stored in the buffers 1i0, 1i1 and 1i2, respectively.

The optic/electric converting mechanisms 2h0 to 2h2, and 3h0 to 3h2 are operated similarly to the optic/electric converting mechanisms 1h0 to 1h2, and the packets converted into the electric signals are temporarily stored in the buffers 2i0 to 2i2, and 3i0 to 3i2, respectively.

The multiplexing mechanism 1j adjusts, and multiplexes a packet addressed to the output port 1r. Similarly, the multiplexing mechanisms 2j and 3j adjust, and multiplex packets addressed to the output ports 2r and 3r, respectively.

The electric/optic converting mechanisms 1k, 2k and 3k convert electric packets outputted from the multiplexing mechanisms 1j, 2j and 3j into optical packets. The packets converted into the optical packets by the electric/optic converting mechanisms 1k, 2k and 3k are respectively outputted from the output ports 1r, 2r and 3r.

FIG. 7(a) shows a configuration and an operation of each of the optical logic devices 1b0 to 1b2, 2b0 to 2b2, and 3b0 to 3b2 when a control light is Off, in the third embodiment of the invention. FIG. 7(b) shows a configuration and an operation of each of the optical logic devices 1b0 to 1b2, 2b0 to 2b2, and 3b0 to 3b2 when a control light is On, in the third embodiment of the invention. Hereinafter, by referring to FIG. 6, and FIGS. 7(a) and 7(b), description is made of the configuration and the operation of the optical logic devices 1b0 to 1b2, 2b0 to 2b2, and 3b0 to 3b2 according to the embodiment.

A function of the optical logic device may be achieved by using, for example a steep transmission characteristic of Fabry-Perot etalon. In Fabry-Perot etalon, when a medium in etalon has a refractive index changed depending on an intensity of an entered light, a phase change of the light reciprocated in the etalon causes a great change in the intensity of the transmitted light. Thus, by entering a control light to Fabry-Perot etalon having a small transmissivity (output light level "0") when there is only an input signal light, a change occurs in the transmissivity depending on a change in a light intensity, making it possible to increase the intensity of the transmitted light (output light level "1"). Accordingly, the optical logic device is achieved (described in "NONLINEAR OPTICS AND QUANTUM ELECTRONICS", by Max Schubert, and Bernd Wilhelmi, published by WILEY-INTERSCIENCE).

When the control light generated based on the address information of the optical packet is not made incident on the optical logic device in synchronization with a timing for entering the optical packet to the optical logic device, the optical packet is not outputted from the optical logic device. In other words, as shown in FIG. 7(a), the optical packet entered when the control light is Off is discarded by the optical logic device.

When the control light generated based on the address information of the optical packet is made incident on the optical logic device in synchronization with a timing for entering the optical packet to the optical logic device, the optical packet is outputted from the optical logic device. In other words, as shown in FIG. 7(b), the optical packet entered when the control light is On is passed through the optical logic device, and outputted from the optical logic device.

Figure 10:
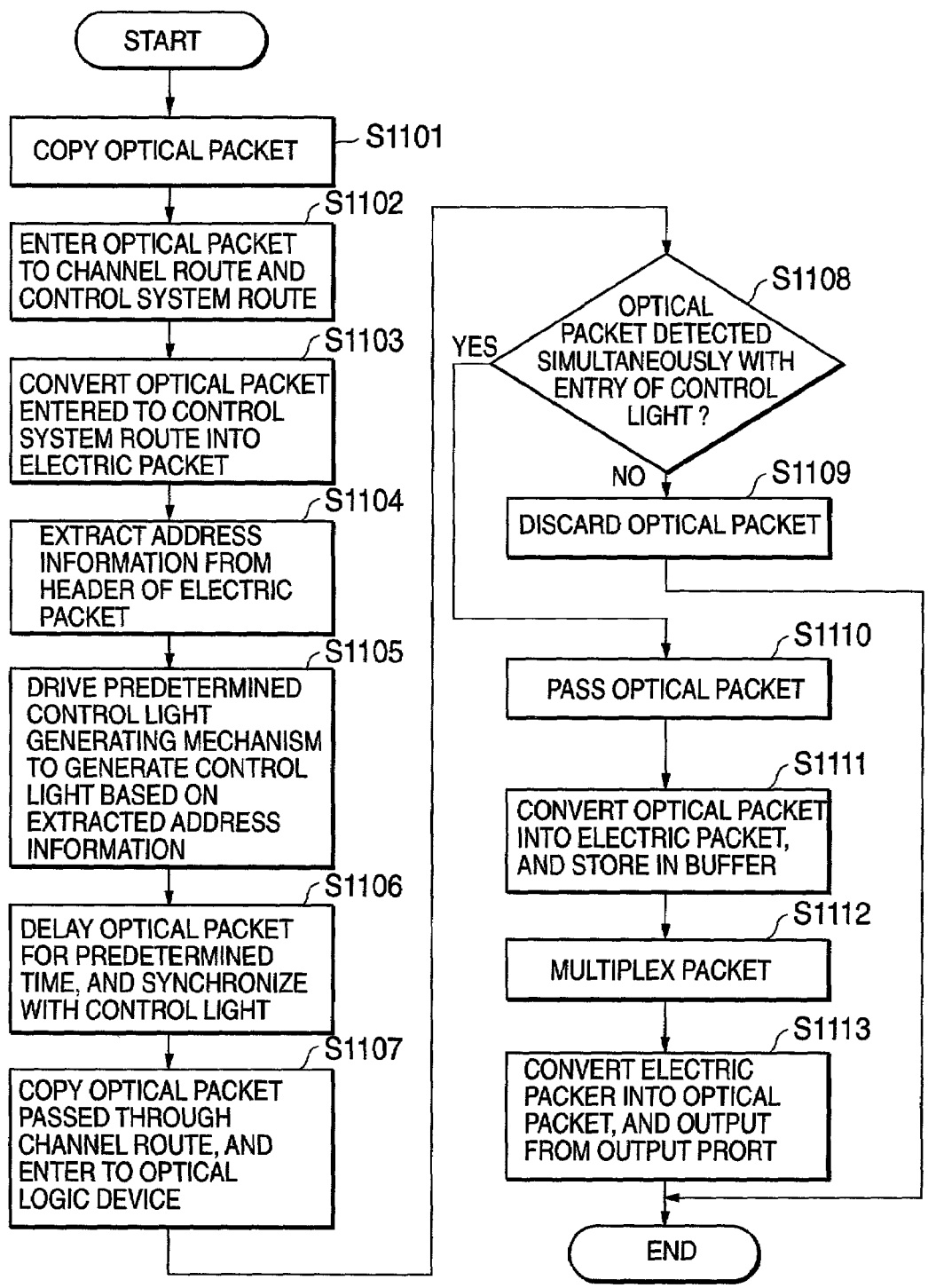
FIG. 10 is a flowchart showing an operational flow of the self-routing apparatus of the optical packet of the third embodiment of the invention.

FIG. 10 is a flowchart showing an operational flow of the optical packet self-routing apparatus according to the third embodiment of the invention. Hereinafter, assuming that an optical packet of the embodiment is similar in structure to the optical-packet of the first embodiment of the invention shown in FIG. 3, by referring to FIGS. 3, 6, 7(a) and 7(b), and along FIG. 10, description is made of the operation of the optical packet self-routing apparatus of the embodiment.

The optical packet self-routing apparatus shown in FIG. 6 is composed of the portions 61, 62 and 63 surrounded by a broken line. The portions 62 and 63 are similar in configuration to the portion 61, and similarly operated. Thus, hereinafter, description is made of the operation of the optical packet self-routing apparatus of the embodiment focusing on the configuration and the operation of the portion 61.

When the optical packets x to z are continuously entered to the input port 10 in this order, the optical packet x is copied by the optical copying mechanism 11 (step S1101). The optical packet x copied by the optical copying mechanism 11 becomes two in number, and then severally entered to the channel route 64 and the control system route 65 (step S1102).

The optical packet x entered to the control system route 65 is converted into an electric packet by the optic/electric converting mechanism 13, being converted into an electric packet x (step S1103). The electric packet x obtained by the conversion at the optic/electric converting mechanism 13 is entered to the address information extracting mechanism 14.

The address information extracting mechanism 14 reads address information recorded in a header of the entered electric packet x (step S1104). The address information contains information on an output port to which the optical packet x is outputted, or the like. The address information extracting mechanism 14 recognizes that an output destination of the optical packet x is an output port $1r$. In addition, the address information extracting mechanism 14 drives the control light generating mechanism 150 to generate a control light based on the recognized output destination of the optical (electric) packet x, i.e., the output port $1r$, such that the optical (electric) packet x can be outputted from the output port $1r$ (S1105).

The control light generating mechanism 150 is driven by the address information extracting mechanism 14 to generate a control light. The generated control light is made incident on the optical logic device $1b0$.

The optical packet x entered to the channel route 64 is delayed by the optical delaying mechanism 12 for a predetermined time (step S1106).

The optical packet x passed through the channel route 64 is entered to the optical copying mechanism $1a$. The optical copying mechanism $1a$ copies the entered optical packet x, forming three packets. The three optical packets x are respectively entered to the optical logic devices $1b0$, $1b1$ and $1b2$ (step S1107).

Each of the optical logic devices $1b0$, $1b1$ and $1b2$ determines incidence of a control light made in synchronization with the entry of the optical packet x (step S1108).

By the delaying of the optical delaying mechanism 12, a timing for entering the optical packet x to the optical logic device $1b0$ is synchronized with a timing for making the control light generated by the control light generating mechanism 150 incident on the optical logic device $1b0$. Thus, the optical logic device $1b0$ detects the control light to be synchronized with the entry of the optical packet x (step S1108/yes), and passes the optical packet x (step S1110).

On the other hand, no control lights made incident in synchronization with the entry of the optical packet x are detected by the optical logic devices $1b1$ and $1b2$ (step S1108/No). Thus, the optical logic devices $1b1$ and $1b2$ discard the optical packet x based on the result of nondetection of the control light (step S1109).

The optical packet x passed through the optical logic device $1b0$ is entered to the optic/electric converting mechanism $1h0$. The optical packets entered to the optical logic devices $1b1$ and $1b2$ are respectively discarded. Accordingly, no optical packets x are outputted from the optical logic devices $1b1$ and $1b2$.

The optic/electric converting mechanism $1h0$ converts the optical packet x into an electric packet x. The electric packet x is temporarily stored in the buffer $1i0$ (step S1111).

When optical packets entered to a plurality of input ports are outputted from the same output port, the optical packets may clash with each other in a route from the plurality of input ports to a single output port. However, by temporarily storing the packets in the buffer as described above, it is possible to prevent clashing of the packets with each other.

Electric packets including the electric packet x are entered from the buffers $1i0$, $2i0$ and $3i0$ to the multiplexing mechanism $1j$. The multiplexing mechanism $1j$ receives and multiplexes the packets from the buffers $1i0$, $2i0$ and $3i0$ in a manner of adjusting the packets so as to prevent clashing thereof (step S1112). Similarly, the multiplexing mechanism $2j$ receives and multiplexes the packets from the buffers $1i1$, $2i1$, and $3i1$ in a manner of adjusting the packets so as to prevent clashing thereof. Further, the multiplexing mechanism $3j$ receives and multiplexes the packets from the buffers $1i2$, $2i2$ and $3i2$ in a manner of adjusting the packets so as to prevent clashing thereof.

The multiplexing mechanisms $1j$, $2j$ and $3j$ respectively send the multiplexed packets to the electric/optic converting mechanism $1k$, $2k$ and $3k$. The electric packet entered to the electric/optic converting mechanism $1k$ is converted into an optical packet, and outputted from the output port 1r (step S1113). Similarly, the packets converted into the optical packets by the electric/optic converting mechanisms 2k and 3k are respectively outputted from the output ports 2r and 3r.

As in the case of the optical packet x, the optical packet y is entered through the optical copying mechanism 11, the channel route 64, and the optical copying mechanism 1a to the optical logic devices 1b0 to 1b2. Based on address information recorded in the header of the optical (electric) packet y, i.e., the output port 3r, the control light generating mechanism 152 generates a control light. The generated control light is made incident on the optical logic device 1b2. By delaying of the optical delaying mechanism 12, a timing for entering the optical packet y to the optical logic device 1b2 is synchronized with a timing for making the control light incident on the optical logic device 1b2. The optical logic device 1b2 detects the entry of the optical packet y and the incidence of the control light, and passes the optical packet y. On the other hand, the optical logic devices 1b0 and 1b1 detect no control lights to be made incident simultaneously with the entry of the optical packet y, and discard the optical packet y. The optical packet y passed through the optical logic device 1b2 is converted into an electric packet y by the optic/electric converting mechanism 1h2, and temporarily stored in the buffer 1i2. The multiplexing mechanism 3j receives and multiplexes packets including the electric packet y from the buffers 1i2, 2i2, and 3i2. The multiplexed packets are converted into optical packets by the electric/optic-converting mechanism 3k, and outputted from the output port 3r.

As in the case of the optical packet x, the optical packet z is entered through the optical copying mechanism 11, the channel route 64, and the optical copying mechanism 1a to the optical logic devices 1b0 to 1b2. Based on address information recorded in the header of the optical (electric) packet z, i.e., the output port 2r, the control light generating mechanism 151 generates a control light. The generated control light is made incident on the optical logic device 1b1. By delaying of the optical delaying mechanism 12, a timing for entering the optical packet z to the optical logic device 1b1 is synchronized with a timing for making the control light incident on the optical logic device 1b1. The optical logic device 1b1 detects the entry of the optical packet z and the incidence of the control light, and passes the optical packet z. On the other hand, the optical logic devices 1b0 and 1b2 detect no control lights to be made incident simultaneously with the entry of the optical packet z, and discard the optical packet z. The optical packet z passed through the optical logic device 1b1 is converted into an electric packet z by the optic/electric converting mechanism 1h1, and temporarily stored in the buffer 1i1. The multiplexing mechanism 2j receives and multiplexes packets including the electric packet z from the buffers 1i1, 2i1, and 3i1. The multiplexed packets are converted into optical packets by the electric/optic converting mechanism 2k, and outputted from the output port 2r.

As described above, according to the embodiment, by achieving the entry of the optical packets and the incidence of the control light to the optical logic devices 1b0 to 1b2, 2b0 to 2b2, and 3b0 to 3b2 with optical processing, it is possible to remove limitations imposed on the transmission distance of an electric control signal.

According to the embodiment, the use of the optical logic device operated by simple control such as passing/discarding of optical packets enables the optical packet self-routing apparatus to be achieved with simple control and configuration.

In each of the first to third embodiments, the optical packet self-routing apparatus is an optical packet self-routing apparatus of 3×3, which has three input ports and three output ports. However, the numbers of input and output ports can be arbitrarily set. Also, the number of various portions provided in the optical packet self-routing apparatus can be decided according to the numbers of input and output ports. In such a case, a value of a wavelength converted by each optical wavelength converting device is prepared according to the number of output ports, and a wavelength of an optical packet entered to each optical wavelength converting device is cyclically converted as in the case of the first to the third embodiments.

The foregoing preferred embodiments are illustrative and not restrictive, and various modifications and changes can be made without departing from the teachings of the invention.

The present invention are advantageous in the following respects.

1. By switching optical packets based on optical processing (no electrical processing), it is possible to remove limitations imposed on a transmission distance when switching is carried out by using an electric signal.

2. Wavelengths of an optical packet and a control light are multiplexed with each other, and a multiplexed optical signal is transmitted to a switching device. Thus, it is possible to remove limitations imposed on a transmission distance when an electric signal is used for a control signal.

3. Based on a value of a cyclic wavelength of an optical packet converted by an optical wavelength converting device connected to a predetermined input port, an optical wavelength converting device connected to the other input port is driven to convert the wavelength of the optical packet. Thus, the number of values of converted wavelengths is reduced, making it possible to achieve an apparatus with a simple configuration.

4. Use of an optical logic device operated by simple control such as passing/discarding of an optical packet enables an optical packet self-routing apparatus to be achieved with simple control and configuration.

While this invention has been described in connection with certain preferred embodiments, it is to be understood that the subject matter encompassed by way of this invention is not limited to those specific embodiments. On the contrary, it is intended for the subject matter of the invention to include all alternative, modification and equivalents as can be included within the spirit and scope of the following claims.

What is claimed is:

1. An apparatus for self-routing an optical packet, comprising:
   one or more input ports and two or more output ports, optical packets entered from predetermined one of the input ports being outputted from predetermined one of the output ports;
   copying unit for copying the optical packets entered from the predetermined input port;
   first electric converting unit for converting one of the optical packets copied by the optical packet copying unit into an electric packet;
   address information extracting unit for extracting address information regarding the predetermined output port for outputting the entered optical packets from the packet converted into the electric packet by the first electric converting unit;
   control light generating unit for generating a predetermined control light based on the address information extracted by the address information extracting unit;

delaying unit for delaying the other of the optical packets copied by the optical packet copying unit for a predetermined time; and route switching unit for switching a route of the optical packet delayed by the delaying unit based on the control light generated by the control light generating unit, wherein based on the control light generated by the control light generating unit, the route switching unit changes a refractive index on the route of the optical packet delayed by the optical packet delaying unit, refracts the delayed optical packet by a predetermined angle, and switches the route of the delayed optical packet.

2. An apparatus for self-routing an optical packet according to claim 1, further comprising:

second electric converting unit for converting the optical packet switched for the route by the optical packet route switching unit into an electric packet;

storing unit for storing the packet converted into the electric packet by the second electric converting unit;

multiplexing unit for multiplexing the packet stored by the storing unit;

optical converting unit for converting the packet multiplexed by the multiplexing unit into an optical packet; and packet outputting unit for outputting the packet converted into the optical packet by the optical converting unit.

3. An apparatus for self-routing an optical packet, comprising:

one or more input ports and two or more output ports, optical packets entered from predetermined one of the input ports being outputted from predetermined one of the output ports;

copying unit for copying the optical packets entered from the predetermined input port;

first electric converting unit for converting one of the optical packets copied by the optical packet copying unit into an electric packet;

address information extracting unit for extracting address information regarding the predetermined output port for outputting the entered optical packets from the packet converted into the electric packet by the first electric converting unit;

control light generating unit for generating a predetermined control light based on the address information extracted by the address information extracting unit;

delaying unit for delaying the other of the optical packets copied by the optical packet copying unit for a predetermined time;

control light wavelength multiplexing unit for multiplexing wavelengths of the control light generated by the optical signal generating unit and the optical packet delayed by the delaying unit with each other;

control light wavelength demultiplexing unit for demultiplexing an optical signal obtained by the multiplexing by the control light wavelength multiplexing unit, and generating the delayed optical packet and the control light;

route switching unit for selecting one of two routes for the optical packet generated by the control light wavelength demultiplexing unit based on the control light generated by the control light wavelength demultiplexing unit;

wavelength converting unit for converting a wavelength of the optical packet having a predetermined route selected by the optical packet route switching unit;

packet wavelength multiplexing unit for multiplexing the wavelength of the optical packet wavelength-converted by the wavelength converting unit;

packet wavelength demultiplexing unit for demultiplexing the optical packet multiplexed by the packet wavelength multiplexing unit into the optical packet before the wavelength multiplexing;

second electric converting unit for converting the optical packet demultiplexed by the packet wavelength demultiplexing unit into an electric packet;

storing unit for storing the packet converted into the electric packet by the second electric converting unit;

multiplexing unit for multiplexing the packet stored by the storing unit;

optical converting unit for converting the packet multiplexed by the multiplexing unit into an optical packet;

packet outputting unit for outputting the packet converted into the optical packet by the optical converting unit; and first to third input ports, and first to third output ports, wherein the route switching unit receiving optical packets entered from the first to third input ports are respectively set as first to third route switching unit, the packet wavelength multiplexing unit receiving optical packets outputted from the first to third output ports are respectively set as first to third packet wavelength multiplexing unit, the wavelength converting unit provided on a route connecting P-th (P=1, 2 and 3) route switching unit with Q-th (Q=1, 2 and 3) packet wavelength multiplexing unit are set as wavelength converting unit (P, Q), when wavelengths converted by wavelength converting unit (1, 1), (1, 2), and (1, 3) are respectively $\lambda1$, $\lambda2$, and $\lambda3$, wavelengths converted by wavelength converting unit (2, 1), (2, 2), and (2, 3) are set to be $\lambda2$, $\lambda3$, and $\lambda1$, wavelengths converted by the wavelength converting unit (2, 1), (2, 2) and (2, 3) are set to be $\lambda3$, $\lambda1$ and $\lambda2$, and thus wavelengths to be converted are circulated.

4. An apparatus according to claim 3, wherein based on the control light generated by the control light wavelength demultiplexing unit, the route switching unit changes own refractive index, refracts the optical packet generated by the control light wavelength demultiplexing unit by a predetermined angle, and selects one of two routes for the generated optical packet.

5. An apparatus according to claim 3, comprising light parallel transmitting unit instead of the control light wavelength multiplexing unit and the control light wavelength demultiplexing unit.

6. An apparatus for self-routing an optical packet, comprising:

one or more input ports and two or more output ports, optical packets entered from predetermined one of the input ports being outputted from predetermined one of the output ports;

copying unit for copying the optical packets entered from the predetermined input port;

first electric converting unit for converting one of the optical packets copied by the optical packet copying unit into an electric packet;

address information extracting unit for extracting address information regarding the predetermined output port for outputting the entered optical packets from the packet converted into the electric packet by the first electric converting unit;

control light generating unit for selecting one of two or more outputs based on the address information extracted by the address information extracting unit, outputting a predetermined control signal from the selected output, and generating a predetermined control light based on the control signal;

delaying unit for delaying the other of the optical packets copied by the optical packet copying unit for a predetermined time; and route switching unit for determining detection of incidence of the control light generated by the control light generating unit, made simultaneously with an entry of the optical packet delayed by the delaying unit, passing the entered optical packet when the incidence of the control light is detected, and discarding the entered optical packet when no incidence of the control light is detected.

7. An apparatus according to claim 6, further comprising:

second electric converting unit for converting the optical packet passed by the optical packet route switching unit into an electric packet;

storing unit for storing the packet converted into the electric packet by the second electric converting unit;

multiplexing unit for multiplexing the packet stored by the storing unit;

optical converting unit for converting the packet multiplexed by the multiplexing unit into an optical packet; and packet outputting unit for outputting the packet converted into the optical packet by the optical converting unit.

8. A method for self-routing an optical packet, using an optical packet self-routing apparatus including one or more input ports and two or more output ports, optical packets entered from predetermined one of the input ports being outputted from predetermined one of the output ports, the method comprising;

a copying step of copying the optical packets entered from the predetermined input port;

a first electric converting step of converting one of the optical packets copied in the optical packet copying step into an electric packet;

an address information extracting step of extracting address information regarding the predetermined output port for outputting the entered optical packets from the packet converted into the electric packet in the first electric converting step;

a control light generating step of generating a predetermined control light based on the address information extracted in the address information extracting step;

a delaying step of delaying the other of the optical packets copied in the optical packet copying step for a predetermined time; and a route switching step of switching a route of the optical packet delayed in the delaying step based on the control light generated in the control light generating step, wherein in the route switching step, based on the control light generated in the control light generating step, a refractive index on the route of the optical packet delayed in the optical packet delaying step is changed, the delayed optical packet is refracted by a predetermined angle, and the route of the delayed optical packet is switched.

9. A method according to claim 8, further comprising a second electric converting step of converting the optical packet switched for the route in the optical packet route switching step into an electric packet, a storing step of storing the packet converted into the electric packet in the second electric converting unit, a multiplexing step of multiplexing the packet stored in the storing step, an optical converting step of converting the packet multiplexed in the multiplexing step into an optical packet, and a packet outputting step of outputting the packet converted into the optical packet in the optical converting step.

10. A method for self-routing an optical packet, using an optical packet self-routing apparatus including one or more input ports and two or more output ports, optical packets entered from predetermined one of the input ports being outputted from predetermined one of the output ports, the method comprising;

a copying step of copying the optical packets entered from the predetermined input port;

a first electric converting step of converting one of the optical packets copied in the optical packet copying step into an electric packet;

an address information extracting step of extracting address information regarding the predetermined output port for outputting the entered optical packets from the packet converted into the electric packet in the first electric converting step;

a control light generating step of generating a predetermined control light based on the address information extracted in the address information extracting step;

a delaying step of delaying the other of the optical packets copied in the optical packet copying unit for a predetermined time;

a control light wavelength multiplexing step of multiplexing wavelengths of the control light generated in the optical signal generating step and the optical packet delayed in the delaying step with each other;

a control light wavelength demultiplexing step of demultiplexing an optical signal obtained by the multiplexing in the control light wavelength multiplexing step, and generating the delayed optical packet and the control light;

a route switching step of selecting one of two routes for the optical packet generated in the control light wavelength demultiplexing step based on the control light generated in the control light wavelength demultiplexing step;

wavelength converting step of converting a wavelength of the optical packet having a predetermined route selected in the optical packet route switching step;

a packet wavelength multiplexing step of multiplexing the wavelength of the optical packet wavelength-converted in the wavelength converting step;

a packet wavelength demultiplexing step of demultiplexing the optical packet multiplexed in the packet wavelength multiplexing step into the optical packet before the wavelength multiplexing;

a second electric converting step of converting the optical packet demultiplexed in the packet wavelength demultiplexing step into an electric packet;

a storing step of storing the packet converted into the electric packet in the second electric converting step;

a multiplexing step of multiplexing the packet stored in the storing step;

an optical converting step of converting the packet multiplexed in the multiplexing step into an optical packet; and a packet outputting step of outputting the packet converted into the optical packet in the optical converting step.

11. A method according to claim 10, including first to third input ports, and first to third output ports, wherein the route switching step receiving optical packets entered from the first to third input ports are respectively set as first to third route switching steps, the packet wavelength multiplexing step receiving optical packets outputted from the first to third output ports are respectively set as first to third packet wavelength multiplexing steps, the wavelength converting step provided on a route connecting P-th (P=1, 2 and 3) route switching step with Q-th (Q=1, 2 and 3) packet wavelength multiplexing step is set as a wavelength converting step (P, Q), when wavelengths converted in the wavelength converting steps (1, 1), (1, 2), and (1, 3) are respectively $\lambda 1$, $\lambda 2$, and $\lambda 3$, wavelengths converted in the wavelength converting steps (2, 1), (2, 2), and (2, 3) are set to be $\lambda 2$, $\lambda 3$, and $\lambda 1$, wavelengths converted in the wavelength converting steps (2, 1), (2, 2) and (2, 3) are set to be $\lambda 3$, $\lambda 1$ and $\lambda 2$, and thus wavelengths to be converted are circulated.

12. A method according to claim 10, wherein in the route switching step, based on the control light generated in the control light wavelength demultiplexing step, own refractive index is changed, the optical packet generated in the control light wavelength demultiplexing step is refracted by a predetermined angle, and one of two routes is selected for the generated optical packet.

13. A method according to claim 10, comprising a light parallel transmitting step instead of the control light wavelength multiplexing step and the control light wavelength demultiplexing step.

14. A method for self-routing an optical packet, using an optical packet self-routing apparatus including one or more input ports and two or more output ports, optical packets entered from predetermined one of the input ports being outputted from predetermined one of the output ports, comprising;
   a copying step of copying the optical packets entered from the predetermined input port;
   a first electric converting step of converting one of the optical packets copied in the optical packet copying step into an electric packet;
   an address information extracting step of extracting address information regarding the predetermined output port for outputting the entered optical packets from the packet converted into the electric packet in the first electric converting step;
   a control light generating step of selecting one of two or more outputs based on the address information extracted in the address information extracting step, outputting a predetermined control signal from the selected output, and generating a predetermined control light based on the control signal;
   a delaying step of delaying the other of the optical packets copied in the optical packet copying step for a predetermined time; and
   a route switching step of determining detection of incidence of the control light generated in the control light generating step, made simultaneously with an entry of the optical packet delayed in the delaying step, passing the entered optical packet when the incidence of the control light is detected, and discarding the entered optical packet when no incidence of the control light is detected.

15. A method according to claim 14, further comprising:
   a second electric converting step of converting the optical packet passed in the optical packet route switching step into an electric packet;
   a storing step of storing the packet converted into the electric packet in the second electric converting step;
   a multiplexing step of multiplexing the packet stored in the storing step;
   an optical converting step of converting the packet multiplexed in the multiplexing step into an optical packet; and
   a packet outputting step of outputting the packet converted into the optical packet in the optical converting step.

* * * * *